(12) United States Patent
Howard et al.

(10) Patent No.: US 12,142,731 B2
(45) Date of Patent: Nov. 12, 2024

(54) ENERGY STORAGE DEVICE

(71) Applicant: Dyson Technology Limited, Wiltshire (GB)

(72) Inventors: Joseph Daniel Howard, Swindon (GB); Michael Edward Rendall, Newbury (GB)

(73) Assignee: Dyson Technology Limited, Wiltshire (GB)

( * ) Notice: Subject to any disclaimer, the term of this patent is extended or adjusted under 35 U.S.C. 154(b) by 771 days.

(21) Appl. No.: 17/261,523

(22) PCT Filed: Jul. 19, 2019

(86) PCT No.: PCT/GB2019/052038
§ 371 (c)(1),
(2) Date: Jan. 19, 2021

(87) PCT Pub. No.: WO2020/016607
PCT Pub. Date: Jan. 23, 2020

(65) Prior Publication Data
US 2021/0273266 A1  Sep. 2, 2021

(30) Foreign Application Priority Data
Jul. 20, 2018 (EP) ........................... 1811883

(51) Int. Cl.
*H01M 10/0585* (2010.01)
*H01M 4/88* (2006.01)
(Continued)

(52) U.S. Cl.
CPC ..... *H01M 10/0585* (2013.01); *H01M 4/8832* (2013.01); *H01M 6/40* (2013.01); *H01M 10/0436* (2013.01); *H01M 10/0562* (2013.01)

(58) Field of Classification Search
CPC .................................................. H01M 10/0585
See application file for complete search history.

(56) References Cited

U.S. PATENT DOCUMENTS

| 8,785,228 B2 | 7/2014 | Brunton | |
| 10,020,540 B2 * | 7/2018 | Shakespeare | ......... H01M 4/661 |
| (Continued) | | | |

FOREIGN PATENT DOCUMENTS

| CN | 102668131 A | 9/2012 |
| CN | 104541386 A | 4/2015 |
| (Continued) | | |

OTHER PUBLICATIONS

International Search Report and Written Opinion mailed Oct. 4, 2019, directed to International Application No. PCT/GB2019/052038; 13 pages.

(Continued)

*Primary Examiner* — Karie O'Neill Apicella
(74) *Attorney, Agent, or Firm* — Tucker Ellis LLP

(57) ABSTRACT

Methods for manufacturing an energy storage device. Such methods comprise providing a first stack on a first side of a substrate and a second stack on a second side of the substrate, opposite to the first side of the substrate. In examples, a first and third groove are formed in the first stack, with different depths than each other, and a second and fourth groove are formed in the second stack, with different depths than each other. In other examples, a first groove is formed in the first stack and a second groove is formed in the second stack, in substantial alignment with the first groove but with a different depth than the first groove.

12 Claims, 15 Drawing Sheets

(51) Int. Cl.
    *H01M 6/40*     (2006.01)
    *H01M 10/04*     (2006.01)
    *H01M 10/0562*     (2010.01)

(56) References Cited

U.S. PATENT DOCUMENTS

| | | |
|---|---|---|
| 10,763,551 B2 * | 9/2020 | Rendall ................... H01M 6/40 |
| 2008/0032236 A1 | 2/2008 | Wallace et al. |
| 2008/0263855 A1 | 10/2008 | Li et al. |
| 2014/0377632 A1 | 12/2014 | Huang |
| 2015/0102530 A1 | 4/2015 | Wallace et al. |
| 2015/0280201 A1 | 10/2015 | Bhardwaj |
| 2017/0288272 A1 | 10/2017 | Kwak et al. |

FOREIGN PATENT DOCUMENTS

| | | | |
|---|---|---|---|
| GB | 2548361 | A | 9/2017 |
| JP | S60-72168 | A | 4/1985 |
| JP | S60-72169 | A | 4/1985 |
| JP | H4-104478 | A | 4/1992 |
| JP | 2000-100471 | A | 4/2000 |
| JP | 2004-022343 | A | 1/2004 |
| JP | 5371979 | B2 | 12/2013 |
| WO | 2006/083660 | A1 | 8/2006 |
| WO | 2014/062676 | A1 | 4/2014 |
| WO | 2017/158319 | A1 | 9/2017 |

OTHER PUBLICATIONS

Search Report dated Sep. 24, 2018, directed to GB Application No. 1811883.6; 2 pages.

\* cited by examiner

ENERGY STORAGE DEVICE

REFERENCE TO RELATED APPLICATIONS

This application is a national stage application under 35 U.S.C. 371 of International Application No. PCT/GB2019/052038, filed Jul. 19, 2019, which claims the priority of United Kingdom Application No. 1811883.6, filed Jul. 20, 2018, the entire contents of each of which are incorporated herein by reference.

FIELD OF THE DISCLOSURE

The present disclosure relates to methods of manufacturing energy storage devices, energy storage devices and intermediate structures for the manufacture of energy storage devices.

BACKGROUND OF THE DISCLOSURE

Energy storage devices such as solid-state thin film cells may be produced by forming a stack of layers on a substrate. The stack of layers typically includes a first electrode layer, a second electrode layer, and an electrolyte layer between the first electrode layer and the second electrode layer. A combination of the stack and the substrate may then be cut into separate sections to form individual cells.

It is desirable to provide a method of manufacturing an energy storage device that is simpler or more efficient than known manufacturing methods.

SUMMARY OF THE DISCLOSURE

According to some embodiments of the present disclosure, there is provided a method for manufacturing an energy storage device, the method comprising:
  providing a first stack on a first side of a substrate, the first stack comprising a first electrode layer, a second electrode layer, and a first electrolyte layer between the first electrode layer and the second electrode layer, the first electrode layer closer than the second electrode layer to the first side of the substrate;
  providing a second stack on a second side of the substrate, opposite to the first side of the substrate, the second stack comprising a third electrode layer, a fourth electrode layer, and a second electrolyte layer between the third electrode layer and the fourth electrode layer, the third electrode layer closer than the fourth electrode layer to the second side of the substrate;
  forming a first groove in a first side of the first stack, the first side of the first stack opposite to a second side of the first stack in contact with the first side of the substrate, the first groove having a first depth;
  forming a second groove in a first side of the second stack, the first side of the second stack opposite to a second side of the second stack in contact with the second side of the substrate, the second groove having a second depth;
  forming a third groove in the first side of the first stack, the third groove having a third depth different from the first depth; and
  forming a fourth groove in the first side of the second stack, the fourth groove having a fourth depth different from the second depth.

Forming the first and third grooves in the first side of the first stack allows the first stack to be processed from a single direction. Similarly, forming the second and fourth grooves in the first side of the second stack also allows the second stack to be processed from a single direction (which is for example opposite to the direction from which the first stack is processed). This therefore facilitates mirrored processing on opposite sides of the same substrate, which may occur at the same time or during a time interval which is at least partly overlapping. The method may therefore be more efficient than otherwise. For example, other cases in which a stack is processed from multiple directions to form grooves in the stack may not be easily adapted to double-sided processing such as in the method according to some embodiments of the disclosure. In these other cases, a stack on a second side of a substrate may interfere with formation of a groove in a first side of the substrate. The method according to embodiments herein may obviate such interference, however, simplifying the formation of grooves in a double-sided structure, which for example includes two stacks on opposite sides of the same substrate. Hence, such a method allows a multi-stack energy storage device to be formed in an efficient manner. The method is scalable and may be performed as part of an efficient, continuous manufacturing process such as a roll-to-roll process.

Furthermore, by providing a first stack and a second stack on opposite sides of the same substrate, a ratio of active material to substrate may be increased compared with examples in which a stack is provided on solely one side of the substrate. The energy storage device may therefore have exhibit an increased energy density.

In some embodiments, the first groove is in substantial alignment with the second groove, and the third groove is in substantial alignment with the fourth groove. By aligning the first and second grooves, and the third and fourth grooves, a multi-stack cell for an energy storage device may be formed more efficiently. For example, a multi-stack structure formed by the method according to some embodiments of the disclosure may be divided into separate cells or separate energy storage devices by cutting the multi-stack structure along a first axis corresponding to the first and second grooves, and along a second axis corresponding to the third and fourth grooves. The number of cutting operations may therefore be reduced compared with other cases in which the first and second grooves or the third and fourth grooves are not aligned with each other.

In some embodiments, the first groove and the second groove are formed without cutting the substrate, the third groove is formed without cutting the first electrode layer, and the fourth groove is formed without cutting the third electrode layer. In other embodiments, though, the first groove is formed without cutting the first electrode layer, the second groove is formed without cutting the substrate, the third groove is formed without cutting the substrate, and the fourth groove is formed without cutting the third electrode layer. In either of these cases, the efficiency of the method may be improved. For example, a smaller quantity of material may be removed during formation of the grooves. The grooves may therefore be formed more rapidly, and hence more efficiently, than in other cases in which a larger quantity of material is removed.

In some embodiments, the first depth is substantially the same as the second depth and the third depth is substantially the same as the fourth depth. In such cases, different instances of the same active layer (such as different instances of a first or second electrode layer) may be exposed along the same side of an energy storage device after subsequent processing. This allows multiple instances of the same layer (such as multiple anodes or multiple cathodes) in different stacks to be connected in parallel, for example using an electrical connector arranged at the side of the energy storage device at which each of the layers is exposed. This for example reduces the risk of short circuits compared with other cases in which multiple instances of the same layer are exposed on different respective sides of the energy storage device.

In other examples, the first depth is substantially the same as the fourth depth and the third depth is substantially the same as the second depth. With such an arrangement, different active layers may be exposed along the same side of an energy storage device after subsequent processing. For example, an anode (which for example corresponds to a portion of a second electrode layer) and a cathode (which for example corresponds to a portion of a first electrode layer) may be alternately exposed along one side of the energy storage device. This provides further flexibility for connection of the energy storage device to an external circuit. For example, this allows different active layers along the same side of the energy storage device to be connected in series, for example using an electrical connector arranged at the side of the energy storage device at which each of the layers is exposed. For example, if an anode and a cathode are alternately exposed along the side of the energy storage device, the anode of one stack may be connected to a cathode of a different stack at that side of the energy storage device, to connect the stacks in series.

In some embodiments, at least one of: the first depth of the first groove, the second depth of the second groove, the third depth of the third groove, or the fourth depth of the fourth groove is substantially perpendicular to a plane of the first side of the substrate. By forming the first, second, third or fourth grooves in this way, subsequent deposition of electrically insulating material within the first, second, third or fourth grooves may be simplified compared with examples in which the grooves are angled with respect to the plane of the surface of the substrate. For example, such an arrangement of the grooves may encourage or otherwise aid movement of the electrically insulating material into the respective groove and improve contact between the electrically insulating material and an exposed surface within the respective groove (such as an exposed surface of the first or second electrode layer). This may reduce the risk of short circuits during subsequent use of an energy storage device formed in this way.

In some embodiments, forming the first groove and forming the third groove uses a first at least one laser beam directed towards the first side of the substrate and forming the second groove and forming the fourth groove uses a second at least one laser beam directed towards the second side of the substrate. This allows the grooves to be formed using a laser ablation process. Laser ablation may be performed rapidly and controlled with relative ease, allowing depths of the grooves to be controlled precisely.

In some embodiments, the method comprises folding the substrate to provide a multi-stack arrangement comprising:
 a first portion of the first stack on a first portion of the first side of the substrate;
 a first portion of the second stack on a first portion of the second side of the substrate, opposite to the first portion of the first side of the substrate, the first portion of the second stack overlapped by the first portion of the first stack;
 a second portion of the first stack on a second portion of the first side of the substrate, the second portion of the first stack overlapped by the first portion of the first stack and the first portion of the second stack; and
 a second portion of the second stack on a second portion of the second side of the substrate, opposite to the second portion of the first side of the substrate, the second portion of the second stack overlapped by the first portion of the first stack, the first portion of the second stack and the second portion of the first stack.

Such a multi-stack arrangement for example has an improved energy density compared with other examples in which there is a single stack per unit of substrate.

In some embodiments, after folding the substrate, the first groove is between the first portion of the first stack and a third portion of the first stack on a third portion of the first side of the substrate in substantially the same plane as the first portion of the first stack and the method comprises cutting the multi-stack arrangement along a longitudinal axis in substantial alignment with the first groove. The number of cutting operations may therefore be smaller than in other cases, improving the efficiency of the method.

In some embodiments, the energy storage device is a first energy storage device, and cutting the multi-stack arrangement separates a first precursor to the first energy storage device from a second precursor to a second energy storage device. In such embodiments, the first precursor comprising the first portion of the first stack, the first portion of the second stack, the second portion of the first stack and the second portion of the second stack. This therefore allows a plurality of energy storage devices to be formed from a single multi-stack arrangement. For example, the plurality of energy storage devices may be formed using a continuous manufacturing process. The energy storage devices may therefore be fabricated more efficiently than in other methods in which single energy storage devices are manufactured one at a time, such as batch processes.

According to some embodiments of the present disclosure, there is provided a method for manufacturing an energy storage device, the method comprising:
 providing a first stack on a first side of a substrate, the first stack comprising a first electrode layer, a second electrode layer, and a first electrolyte layer between the first electrode layer and the second electrode layer, the first electrode layer closer than the second electrode layer to the first side of the substrate;
 providing a second stack on a second side of the substrate, opposite to the first side of the substrate, the second stack comprising a third electrode layer, a fourth electrode layer, and a second electrolyte layer between the third electrode layer and the fourth electrode layer, the third electrode layer closer than the fourth electrode layer to the second side of the substrate;
 forming a first groove in a first side of the first stack, the first side of the first stack opposite to a second side of the first stack in contact with the first side of the substrate, the first groove having a first depth; and
 forming a second groove in a first side of the second stack, in substantial alignment with the first groove, the first side of the second stack opposite to a second side of the second stack in contact with the second side of the substrate, the second groove having a second depth different from the first depth.

Some embodiments of the disclosure facilitate formation of a multi-stack arrangement, with the first stack arranged on the first side of the substrate and the second stack arranged on the second side of the substrate. This allows both the first and second stacks to be processed at the same time as each other, which may improve an efficiency of formation of the first and second stacks. Moreover, a ratio of active material to substrate may be increased compared with examples in which a stack is provided on solely one side of the substrate. The energy storage device may therefore exhibit an increased energy density.

Furthermore, with the second depth of the second groove being different from the first depth of the first groove, an exposed surface within the second groove may include a surface of a different layer than an exposed surface within the first groove, after subsequent processing. For example, a cathode (which for example corresponds to a portion of a first electrode layer) may be exposed within the first groove whereas an anode (which for example corresponds to a portion of a second electrode layer) may be exposed within the second groove. Due to the alignment between the first and second grooves, the exposed portions of the cathode and the anode in such cases may be aligned along the same side of the energy storage device. In this way, a cathode and an anode may be connected, in series, for example using an electrical connector arranged at the side of the energy storage device at which each of the layers is exposed. In this way, the first and the second stack may be connected in series.

In some embodiments, the first groove is formed without cutting the first electrode layer and the second groove is formed without cutting the substrate. Such examples may be more efficient by removing a smaller quantity of material, allowing the grooves to be formed more rapidly.

In some embodiments, forming the first groove uses a first at least one laser beam directed towards the first side of the substrate and forming the second groove uses a second at least one laser beam directed towards the second side of the substrate. This allows the grooves to be formed using a laser ablation process, which is typically rapid and accurate.

According to some embodiments of the present disclosure, there is provided a multi-stack structure for an energy storage device, the multi-stack structure comprising:
  a first stack on a first side of a substrate, the first stack comprising:
    a first electrode;
    a second electrode; and
    a first electrolyte between the first electrode and the second electrode, the first electrode closer than the second electrode to the first side of the substrate;
  a second stack on a second side of the substrate, opposite to the first side of the substrate, the second stack comprising:
    a third electrode;
    a fourth electrode; and
    a second electrolyte between the third electrode and the fourth electrode, the third electrode closer than the fourth electrode to the second side of the substrate;
  a first electrical insulator in contact with a first exposed surface of the first electrode and a first exposed surface of the first electrolyte without contacting at least a portion of a first exposed surface of the second electrode;
  a second electrical insulator in contact with a first exposed surface of the third electrode and a first exposed surface of the second electrolyte without contacting at least a portion of a first exposed surface of the fourth electrode;
  a third electrical insulator in contact with a second exposed surface of the first electrode, a second exposed surface of the first electrolyte and a second exposed surface of the second electrode; and
  a fourth electrical insulator in contact with a second exposed surface of the third electrode, a second exposed surface of the second electrolyte and a second exposed surface of the fourth electrode.

In some embodiments of the present disclosure, such a multi-stack structure for example has a larger ratio of active material to inactive material. An active material of an energy storage device may include chemically active components of the energy storage device, such as electrodes, as well as the electrolyte. For example, the active material may include material of the first and third electrodes, which are for example cathodes, and material of the second and fourth electrodes, which are for example anode. Conversely, an inactive material of an energy storage device may include chemically inactive components, which do not participate in the storage or transfer of chemical energy. An inactive material may be or include material of the substrate. By having a larger ratio of active material to inactive material, the energy density of the multi-stack structure may be larger than other structures with a smaller ratio of active material to inactive material.

The first, second, third and fourth electrical insulators for example reduce the risk of short circuits, which may otherwise occur if the first and second electrodes or the third and fourth electrodes come into electrical contact with each other.

In some embodiments, the first electrical insulator is in substantial alignment with the second electrical insulator and the third electrical insulator is in substantial alignment with the fourth electrical insulator. However, in other examples, the first electrical insulator is in substantial alignment with the fourth electrical insulator and the third electrical insulator is in substantial alignment with the second electrical insulator. In either case, further processing of the multi-stack arrangement may be simplified. For example, due to the alignment of respective pairs of electrical insulators, the multi-stack arrangement may be provided with a relatively smooth or planar surface, which may for example be a side of the multi-stack arrangement. With such an arrangement, it may be more straightforward to subsequently deposit electrically conductive material for connection of exposed portions of the electrodes to an external circuit compared with other examples in which a surface of the multi-stack arrangement device is non-planar.

In some embodiments, the first electrical insulator is arranged at a first side of the first stack, the second electrical insulator is arranged at a first side of the second stack, the third electrical insulator is arranged at a second side of the first stack, opposite to the first side of the first stack, and the fourth electrical insulator is arranged at a second side of the second stack, opposite to the second side of the second stack. Hence, at the first side of the first stack, the first electrical insulator may insulate the first exposed surface of the first electrode (which may also be at the first side of the stack) from the first exposed surface of the second electrode. Similarly, at the second side of the stack, the second electrical insulator may insulate the second exposed surface of the second electrode (which may also be at the second side of the stack) from the second exposed surface of the first electrode. The third and fourth electrical insulators may similarly insulate exposed surfaces of the third and fourth electrodes from each other. In this way, short circuits may be effectively prevented or reduced.

In alternative examples, the first electrical insulator is arranged at a first side of the first stack, the fourth electrical insulator is arranged at a first side of the second stack, the third electrical insulator is arranged at a second side of the first stack, opposite to the first side of the first stack, and the second electrical insulator is arranged at a second side of the second stack, opposite to the second side of the second stack. Such examples may also prevent or reduce short circuits.

In some embodiments, at least one of:
the third electrical insulator overlaps the second exposed surface of the first electrode, and a plane of the second exposed surface of the first electrode is substantially parallel to a plane of the first side of the substrate; or
the fourth electrical insulator is overlapped by the second exposed surface of the third electrode, and a plane of the second exposed surface of the third electrode is substantially parallel to a plane of the second side of the substrate.

With such an arrangement, the second exposed surface of the first electrode and the second exposed surface of the third electrode may each form a respective shelf or ledge, onto which the electrically insulating material to form the third and fourth electrical insulators may be straightforwardly deposited.

In some embodiments, a thickness of the substrate in a direction perpendicular to a plane of the first side of the substrate is substantially the same as or larger than at least one of: a first thickness of the first stack or a second thickness of the second stack, in the direction perpendicular to the plane of the first side of the substrate. In such cases, the multi-stack structure may be manufactured straightforwardly, for example using methods in accordance with some embodiments of the present disclosure. For example, a depth of the grooves (which may subsequently be at least partly filled with electrically insulating material, for example to form the electrical insulators) may be more easily controlled. The depth of the grooves may be more easily controlled using methods in accordance with some embodiments of the present disclosure (in which each of the grooves in the same stack are formed from the same side of the substrate), than in other methods in which grooves are formed by processing the same stack from different sides of the same substrate. These other methods may be susceptible to deviations in groove depth from a desired depth where the thickness of the substrate is substantially the same as or larger than the thickness of the stack in which the groove is to be formed. However, by forming the grooves from the same side, such deviations in groove depth may be reduced.

According to some embodiments of the present disclosure, there is provided a multi-stack structure for an energy storage device, the multi-stack structure comprising:
a first stack on a first side of a substrate, the first stack comprising:
a first electrode;
a second electrode; and
a first electrolyte between the first electrode and the second electrode, the first electrode closer than the second electrode to the first side of the substrate;
a second stack on a second side of the substrate, opposite to the first side of the substrate, the second stack comprising:
a third electrode;
a fourth electrode; and
a second electrolyte between the third electrode and the fourth electrode, the third electrode closer than the fourth electrode to the second side of the substrate;
a first electrical insulator in contact with an exposed surface of the first electrode, an exposed surface of the first electrolyte, and an exposed surface of the second electrode; and
a second electrical insulator in contact with an exposed surface of the third electrode and an exposed surface of the second electrolyte without contacting at least a portion of an exposed surface of the fourth electrode.

As explained with reference to some embodiments of the disclosure, such a multi-stack structure for example has a larger energy density than a single stack structure.

In some embodiments, the first electrical insulator is in substantial alignment with the second electrical insulator. In such cases, further processing of the multi-stack arrangement may be simplified, for example due to a more planar surface of the multi-stack arrangement.

In some embodiments, the first electrical insulator overlaps the exposed surface of the first electrode, and a plane of the exposed surface of the first electrode is substantially parallel to a plane of the first side of the substrate. With such an arrangement, the exposed surface of the first electrode may form a shelf or ledge, onto which the electrically insulating material to form the first electrical insulator may be straightforwardly deposited.

In some embodiments, a thickness of the substrate in a direction perpendicular to a plane of the first side of the substrate is substantially the same as or larger than at least one of: a first thickness of the first stack or a second thickness of the second stack, in the direction perpendicular to the plane of the first side of the substrate. Such a multi-stack structure may be fabricated with improved accuracy, for example using methods in accordance with some embodiments of the present disclosure.

According to some embodiments of the disclosure, there is provided apparatus comprising: a first inkjet material deposition component arranged to deposit a material over a first side of a stack for an energy storage device; a second inkjet material deposition component arranged to deposit a material over a second side of the stack, the second side being opposite to the first side; and a plurality of rollers arranged to guide movement of the stack between the first inkjet material deposition component and the second inkjet material deposition component such that the first side of the stack is presented for top-down inkjet material deposition of the material onto the stack from the first inkjet material deposition component and such that the second side of the stack is presented for top-down inkjet material deposition of the material onto the stack from the second inkjet material deposition component.

Performing the ink-jet material deposition, such as ink-jet printing, top-down may allow for accurate and efficient deposition of the material onto the stack. Ensuring that both sides of a stack are presented for top-down printing may allow for the accurate and efficient deposition of material onto the stack even in the case of stacks comprising layers on both sides of a substrate. In some embodiments, the apparatus is arranged to perform the method according to some embodiments.

Further features will become apparent from the following description, given by way of example only, which is made with reference to the accompanying drawings.

DETAILED DESCRIPTION OF THE DISCLOSURE

Details of methods, structures and devices according to examples/embodiments will become apparent from the following description, with reference to the Figures. In this description, for the purpose of explanation, numerous specific details of certain examples/embodiments are set forth. Reference in the specification to "an example," "an embodiment," or similar language means that a particular feature, structure, or characteristic described in connection with the example/embodiment is included in at least that one example/embodiment, but not necessarily in other examples/embodiments. It should further be noted that certain examples/embodiments are described schematically with certain features omitted and/or necessarily simplified for ease of explanation and understanding of the concepts underlying the examples/embodiments.

Figure 1:
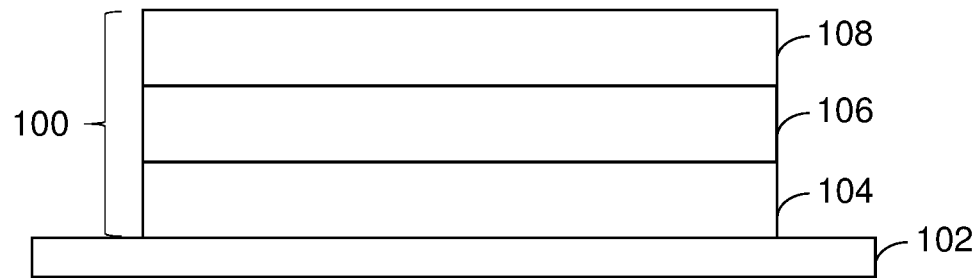
FIG. 1 is a schematic diagram of a stack for an energy storage device according to some embodiments.

FIG. 1 shows a stack 100 of layers for an energy storage device. The stack 100 of FIG. 1 may be used as part of a thin-film energy storage device having a solid electrolyte, for example.

The stack 100 is on a substrate 102 in FIG. 1. The substrate 102 is for example glass or polymer and may be rigid or flexible. The substrate 102 is typically planar. Although the stack 100 is shown as directly contacting the substrate 102 in FIG. 1, there may be one or more further layers between the stack 100 and the substrate 102 in other examples. Hence, unless otherwise indicated, reference herein to an element being "on" another element is to be understood as including direct or indirect contact. In other words, an element on another element may be either touching the other element, or not in contact with the other element but, instead, generally supported by an intervening element (or elements) but nevertheless located above, or overlapping, the other element.

The stack 100 of FIG. 1 includes a first electrode layer 104, an electrolyte layer 106 and a second electrode layer 108. In the example of FIG. 1, the second electrode layer 108 is further from the substrate 102 than the first electrode layer 104, and the electrolyte layer 106 is between the first electrode layer 104 and the second electrode layer 108.

The first electrode layer 104 may act as a positive current collector layer. In such embodiments, the first electrode layer 104 may form a positive electrode layer (which may correspond with a cathode during discharge of a cell of the energy storage device including the stack 100). The first electrode layer 104 may include a material which is suitable for storing lithium ions by virtue of stable chemical reactions, such as lithium cobalt oxide, lithium iron phosphate or alkali metal polysulphide salts.

In alternative embodiments, there may be a separate positive current collector layer, which may be located between the first electrode layer 104 and the substrate 102. In these embodiments, the separate positive current collector layer may include nickel foil, but it is to be appreciated that any suitable metal could be used, such as aluminium, copper or steel, or a metalised material including metalised plastics such as aluminium on polyethylene terephthalate (PET).

The second electrode layer 108 may act as a negative current collector layer. The second electrode layer 108 in such cases may form a negative electrode layer (which may correspond with an anode during discharge of a cell of an energy storage device including the stack 100). The second electrode layer 108 may include a lithium metal, graphite, silicon or indium tin oxide (ITO). As for the first electrode layer 104, in other examples, the stack 100 may include a separate negative current collector layer, which may be on the second electrode layer 108, with the second electrode layer 108 between the negative current collector layer and the substrate 102. In some embodiments in which the negative current collector layer is a separate layer, the negative current collector layer may include nickel foil. It is to be appreciated, though, that any suitable metal could be used for the negative current collector layer, such as aluminium, copper or steel, or a metalised material including metalised plastics such as aluminium on polyethylene terephthalate (PET).

The first and second electrode layers 104, 108 are typically electrically conductive. Electrical current may therefore flow through the first and second electrode layers 104, 108 due to the flow of ions or electrons through the first and second electrode layers 104, 108.

The electrolyte layer 106 may include any suitable material which is ionically conductive, but which is also an electrical insulator, such as lithium phosphorous oxynitride (LiPON). As explained above, the electrolyte layer 106 is for example a solid layer, and may be referred to as a fast ion conductor. A solid electrolyte layer may have structure which is intermediate between that of a liquid electrolyte, which for example lacks a regular structure and includes ions which may move freely, and that of a crystalline solid. A crystalline material for example has a regular structure, with an ordered arrangement of atoms, which may be arranged as a two dimensional or three dimensional lattice. Ions of a crystalline material are typically immobile and may therefore be unable to move freely throughout the material.

The stack 100 may for example be manufactured by depositing the first electrode layer 104 on the substrate 102. The electrolyte layer 106 is subsequently deposited on the first electrode layer 104, and the second electrode layer 108 is then deposited on the electrolyte layer 106. Each layer of the stack 100 may be deposited by flood deposition, which provides a simple and effective way of producing a highly homogenous layer, although other deposition methods are possible.

The stack 100 of FIG. 1 may undergo further processing to manufacture an energy storage device. An example of processing that may be applied to the stack 100 of FIG. 1 is illustrated schematically in FIG. 2.

Figure 2:
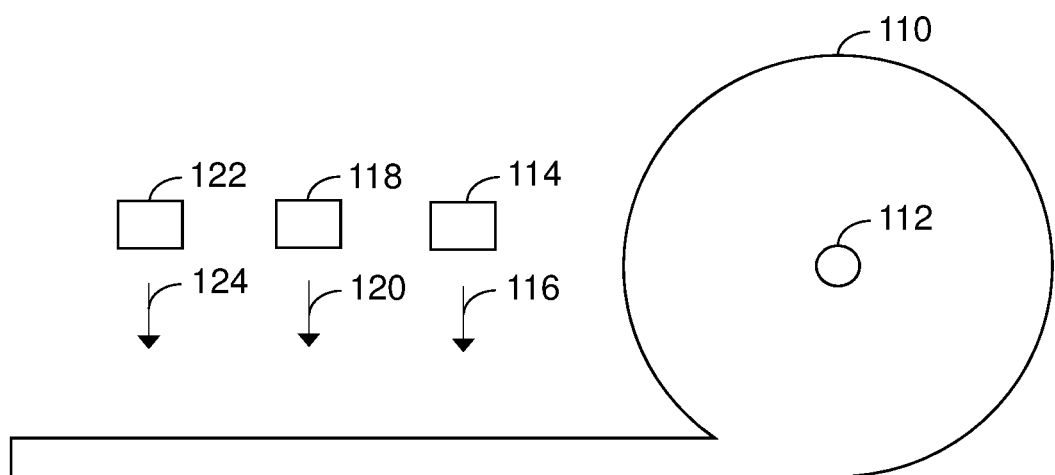
FIG. 2 is a schematic diagram of an example of processing the stack of FIG. 1 for manufacture of an energy storage device according to some embodiments.

In FIG. 2, the stack 100 and the substrate 102 together form an intermediate structure 110 for the manufacture of an energy storage device. The intermediate structure 110 in this example is flexible, allowing it to be wound around a roller 112 as part of a roll-to-roll manufacturing process (sometimes referred to as a reel-to-reel manufacturing process). The intermediate structure 110 may be gradually unwound from the roller 112 and subjected to further processing.

In the example of FIG. 2, grooves may be formed through the intermediate structure 110 (for example through the stack 100) using a first laser 114. The first laser 114 is arranged to apply laser beams 116 to the intermediate structure 110 to remove portions of the intermediate structure, thereby forming grooves in the stack 100. This process may be referred to as laser ablation.

After formation of the grooves, electrically insulating material may be deposited in at least some of the grooves using a material deposition system 118. The material deposition system 118 for example fills at least some of the grooves with a liquid 120 such as an organic suspended liquid material. The liquid 120 may then be cured in the grooves to form electrically insulating plugs in the grooves. An electrically insulating material may be considered to be electrically non-conductive and may therefore conduct a relatively a small amount of electric current when subjected to an electric field. Typically, an electrically insulating material (sometimes referred to as an insulator) conducts less electric current than semiconducting materials or electrically conductive materials. However, a small amount of electric current may nevertheless flow through an electrically insulating material under the influence of an electric field, as even an insulator may include a small amount of charge carriers for carrying electric current. In some embodiments herein, a material may be considered to be electrically insulating where it is sufficiently electrically insulating to perform the function of an insulator. This function may be performed for example where the material insulates one element from another sufficiently for short circuits to be avoided.

Referring to FIG. 2, after deposition of the electrically insulating material, the intermediate structure 110 is cut along at least some of the grooves to form separate cells for an energy storage device. In some embodiments such as FIG. 2, hundreds and potentially thousands of cells can be cut from a roll of the intermediate structure 110, allowing multiple cells to be manufactured in an efficient manner.

In FIG. 2, the cutting operation is performed using a second laser 122, which is arranged to apply laser beams 124 to the intermediate structure 110. Each cut may for example be through the centre of an insulating plug such that the plug is split into two pieces, each piece forming a protective covering over exposed surfaces including edges to which it has attached. Cutting through the entire stack in this way creates exposed surfaces of the first and second electrode layers 104, 108.

Although not shown in FIG. 2 (which is merely schematic), it is to be appreciated that, after deposition of the electrically insulating material, the intermediate structure 110 may be folded back on itself, to create a z-fold arrangement having at least ten, possibly hundreds, and potentially thousands, of layers with each of the insulating plugs aligned. The laser cutting process performed by the second laser 122 may then be used to cut through the z-fold arrangement in a single cutting operation for each of the aligned sets of plugs.

After cutting the cells, electrical connectors can be provided along opposite sides of a cell, such that a first electrical connector on one side of the cell contacts the first electrode layer 104 (which may be considered to form a first electrode after the cell has been separated from the remainder of the intermediate structure 110), but is prevented from contacting the other layers by the electrically insulating material. Similarly, a second electrical connector on an opposite side of the cell can be arranged in contact with the second electrode layer 108 (which may be considered to form a second electrode after the cell has been separated from the remainder of the intermediate structure 110), but is prevented from contacting the other layers by the insulating material. The insulating material may therefore reduce the risk of a short circuit between the first and second electrode layers 104, 108 and the other layers in each cell. The first and second electrical connectors may, for example, be a metallic material that is applied to the edges of the stack (or to the edges of the intermediate structure 110) by sputtering. The cells can therefore be joined in parallel simply and easily.

FIGS. 3a to 3e (collectively referred to as FIG. 3) are schematic diagrams illustrating features of an example method of manufacturing an energy storage device. Features of FIG. 3 which are the same as corresponding features of FIG. 1 are labelled with the same reference numerals. Corresponding descriptions are to be taken to apply. The same reference numerals are used to denote the same elements in each of FIGS. 3a to 3e. However, not all elements are labelled in each of FIGS. 3a to 3e, for clarity. Elements which are labelled in one of FIGS. 3a to 3e but not in another of FIGS. 3a to 3e may nevertheless be present, as the processing of FIGS. 3a to 3e may be applied sequentially to the same stack.

Figure 3A:
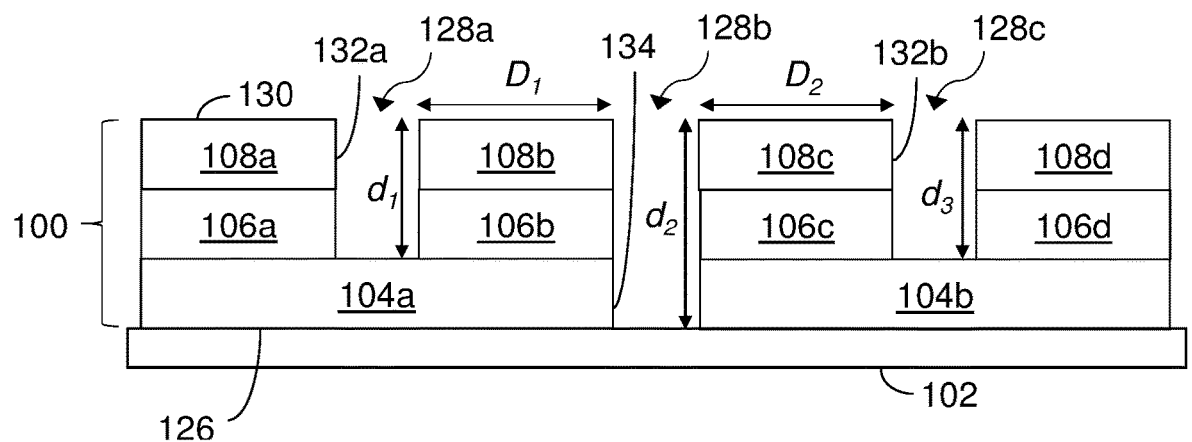
FIGS. 3a to 3e are schematic diagrams illustrating a method of manufacturing an energy storage device according to some embodiments.

Prior to FIG. 3a, methods in accordance with FIG. 3 include providing a stack 100 on a surface 126 of a substrate 102. In this example, the stack 100 and the surface 102 are as shown in FIG. 1. However, in other examples, methods in accordance with FIG. 3 may be applied to other stacks with different structures or layers than those shown in FIG. 1.

The layers of the stack 100 (in this case, the first electrode layer 104, the electrolyte layer 106 and the second electrode layer 108) may be provided sequentially. However, in other embodiments, the substrate may be provided partially assembled. For example, a stack including the first electrode layer, the electrolyte layer and the second electrode layer may already be arranged on the substrate before the substrate is provided.

In FIG. 3a, a first groove 128a, a second groove 128b and a third groove 128c are formed in a first side 130 of the stack 100. The first, second and third grooves 128a-128c may be referred to collectively using the reference numeral 128. The first side 130 of the stack 100 is opposite to a second side of the stack 100 which is on the surface 126 of the substrate 102. Hence, the first side 130 of the stack 100 is for example an exposed surface of the stack 100, which is not in contact with or otherwise obscured by another component. In this example, the first side 130 of the stack 100 is an upper surface of the stack 100, although this need not be the case in other examples.

A groove is for example a channel, slot or trench that may be continuous or non-continuous. In some embodiments, a groove may be elongate. A groove may extend partway through the layers of a stack 100, or through all the layers of the stack 100 to expose a portion of the substrate 102. A groove for example provides a channel for subsequent deposition of further materials, such as a liquid or other fluid.

In FIG. 3a, the first groove 128a has a first depth d1, the second groove 128b has a second depth d2 and the third groove 128c has a third depth d3. The first depth d1 is substantially the same as the third depth d3, whereas the first depth d1 is different from the second depth d2. Each of the depths d1, d2, d3 of the grooves 128 are taken in a direction substantially perpendicular to a plane of the surface 126 of the substrate 102 in FIG. 3a. A direction may be considered substantially perpendicular to a plane where the direction is exactly perpendicular to the plane or approximately perpendicular to the plane, such as within measurement tolerances or with an angular deviation of within plus or minus 5, 10 or 20 degrees from perpendicular. In such cases, the grooves 128 may be considered to extend or be otherwise elongate in this direction. In these cases, the grooves 128 may additionally be elongate in a different direction, such as in a direction perpendicular to this (such as a direction into or out of the page with reference to FIG. 3a). For example, a central axis of a groove, which extends from a mouth or opening of the groove towards a base of the groove, may be in the direction substantially perpendicular to the plane of the surface 126 of the substrate 102.

However, in other embodiments, some or all of the grooves 128 may extend along an axis which is at a different angle with respect to the plane of the surface 126 of the substrate 102 than substantially perpendicular. For example, some or all of the grooves 128 may have an inner surface which is at an acute angle (such as an angle of less than 90 degrees) with respect to the plane of the surface 126 of the substrate 102. However, this may make it more difficult to deposit materials within the grooves 128 subsequently compared with examples such as FIG. 3a, in which the inner surfaces of the grooves 128 are substantially perpendicular to the plane of the surface 126 of the substrate 102.

The first, second and third grooves 128a, 128b, 128c separate the various layers of the stack 100 into different portions. In FIG. 3a, the first groove 128a separates the first electrode layer 108 into a first and second portion 108a, 108b. The first groove 128a also separates the electrolyte layer 106 into a first and second portion 106a, 106b. The second groove 128b separates the second portion 108b of the first electrode layer 108 from a third portion 108c of the first electrode layer 108. The second groove 128b also separates the second portion 106b of the electrolyte layer 106 from a third portion 106c of the electrolyte layer 106. In addition, the second groove 128b separates the second electrode layer 104 into a first portion 104a and a second portion 104b. In FIG. 3a, the third groove 128c separates the third portion 108c of the first electrode layer 108 from a fourth portion 108d of the first electrode layer 108, and separates the third portion 106c of the electrolyte layer 106 from a fourth portion 106d of the electrolyte layer 106. Unlike the second groove 128b, neither the first groove 128a nor the third groove 128c separates portions of the second electrode layer 104.

In FIG. 3a, the first groove 128a has a first surface which includes a first exposed surface 132a of the second electrode layer 108. In this example, the first exposed surface 132a of the second electrode layer 108 is a surface of the first portion 108a of the second electrode layer 108. However, the first surface of the first groove 128a also includes exposed surfaces of the second portion 108b of the second electrode layer 108, and the first and second portions 106a, 106b of the electrolyte layer 106. The first surface of the first groove 128a additionally includes an exposed surface of the first portion 104a of the first electrode layer 104, which in this example is an upper surface of the first portion 104a of the first electrode layer 104. Hence, in this example, the first groove 128a is formed through the second electrode layer 108 and the electrolyte layer 106. The exposed surfaces of the second electrode layer 108 and the electrolyte layer 106 therefore form sides of the first groove 128a, whereas the exposed surface of the first electrode layer 104 forms a base or bottom region of the first groove 128a. The first groove 128a does not extend through the first electrode layer 104 or the substrate 102.

An exposed surface of a groove is for example a surface that is not covered or otherwise in contact with another layer after formation of the groove. In this way, an exposed surface is for example uncovered, revealed or otherwise on display after formation of the groove. An exposed surface may for example correspond with a wall, side, side wall or face of the groove. Hence, an exposed surface may be or include any surface within the groove, which is uncovered. For example, an exposed surface may be or include a vertical wall of the groove or a generally upwardly extending inner surface of the groove, which extends in an upward direction with respect to the substrate 102. This is the case in FIG. 3a, in which the first surface of the first groove 128a (which is for example an exposed surface of the first groove 128a) includes a side of the first and second portions 108a, 108b of the first electrode layer 108 and a side of the first and second portions 106a, 106b of the electrolyte layer 106. Alternatively, an exposed surface may be or include a horizontal wall of the groove or a wall or other surface of the groove which extends in a plane which is generally parallel to the horizontal or to a plane of the surface 126 of the substrate 102. For example, an exposed surface may be or include a horizontal bottom surface of the groove, which is for example a deepest surface of the groove, which may be closest to the substrate 102. In other embodiments, the groove may include one or more shelf or ledge portions, which may extend in a plane which is generally parallel to the horizontal or to a plane of the substrate.

The second groove 128b has a second surface which includes an exposed surface 134 of the first electrode layer 104. In this example, the exposed surface 134 of the first electrode layer 104 is a surface of the first portion 104a of the first electrode layer 104 (in this example, a surface of a side of the first portion 104a of the first electrode layer 104, which extends away from the plane of the surface 126 of the substrate 102). However, the second surface of the second groove 128b also includes exposed surfaces of the second and third portions 106b, 106c of the electrode layer 106 and exposed surfaces of the second and third portions 108b, 108c of the second electrode layer 108. Hence, in this example, the second groove 128b is formed through the second electrode layer 108, the electrolyte layer 106 and the first electrode layer 104, which for example form sides of the second groove 128b. The second groove 128b does not extend through the substrate 102, although the surface 126 of the substrate 102 in FIG. 3a corresponds with a base of the second groove 128b. The second groove 128b is located between the first groove 128a and the third groove 128c.

The third groove 128c has a third surface which includes a second exposed surface 132b of the second electrode layer 108. In this example, the second exposed surface 132b of the second electrode layer 108 is a surface of the third portion 108c of the second electrode layer 108. However, the third surface of the third groove 128c also includes an exposed surface of the third portion 106c of the electrolyte layer 106 as well as exposed surfaces of the fourth portions 108d, 106d of the second electrode layer 108 and the electrolyte layer 106. The third surface of the third groove 128c also includes an exposed surface of the second portion 104b of the second portion 104b of the first electrode layer 104, which for example corresponds with a base of the third groove 128c. Hence, in this example, the third groove 128c is formed through the second electrode layer 108 and the electrolyte layer 106, which for example form sides of the third groove 128c. The third groove 128c does not extend through the first electrode layer 104 or the substrate 102 though.

Due to the first and third depths d1, d3 of the first and third grooves 128a, 128c being different from the second depth d2 of the second groove 128b, the second groove 128b extends through the first electrode layer 104, whereas the first and third grooves 128a, 128c are not sufficiently deep to extend through the first electrode layer 104. This exposes side surfaces of the second electrode layer 108 within the first and third grooves 128a, 128c (which may be considered to be inner surfaces or side walls of the first and third grooves 128a, 128c). A side surface of the first electrode layer 104 is not exposed within the first and third grooves 128a, 128c. Instead, an upper surface of the first electrode layer 104 forms a base of the first and third grooves 128a, 128c. However, side surfaces of the first electrode layer 104 are exposed within the second groove 128b, which is deeper than the first and third grooves 128a, 128c. In other embodiments, though, side surfaces of the same layers may be exposed in each of the grooves, with side surfaces of different portions of the same layers being exposed in different ones of the grooves. However, the first and third grooves in such cases may nevertheless have substantially the same depth as each other, but a different depth than the second groove.

In FIG. 3a, the first groove 128a is spaced apart from, and substantially parallel to, the second groove 128b, and the second groove 128b is spaced apart from, and substantially parallel to, the third groove 128c. Two grooves may be considered to be substantially parallel to each other where they are exactly parallel to each other or where they are parallel to each other within manufacturing tolerances, or within less than 20 degrees, 15 degrees, 10 degrees or 5 degrees. In other words, the first, second and third grooves 128 each extend in generally the same direction as each other. This may simplify formation of the first, second and third grooves 128.

In FIG. 3a, the grooves 128 have a substantially constant or otherwise uniform cross-section. The cross-section of a groove is for example taken in a direction perpendicular to a depth of the groove, and may therefore correspond with a width of the groove. In FIG. 3a, the grooves 128 are cylindrical in shape. However, in other examples, the grooves may have different shapes. For example, a cross-section of a groove may increase or decrease in size away from a base of the groove or may be non-uniform in size. Some or all of the grooves 128 may have substantially the same width as each other, such as precisely the same width or the same width within manufacturing tolerances or with a deviation of less than 20%, 15%, 10% or 5%. It may be more straightforward to manufacture the grooves 128 with the same width as each than with different widths. For example, this may obviate a need to adjust manufacturing equipment in between formation of neighbouring grooves, which may be otherwise needed to form grooves of different widths. A width of a groove may be taken in a direction parallel to a plane of the surface 126 of the substrate 102, which may be perpendicular to the depth of a groove. In other examples, though, one or more of the grooves may have a different width and/or shape than another of the grooves.

In example such as FIG. 3a, a first distance D1 between the first groove 128a and the second groove 128b, in a direction parallel to a plane of the surface 126 of the substrate 102, is substantially the same as a second distance D2 between the second groove 128b and the third groove 128c, in the same direction. Two distances may be considered substantially the same where they are exactly the same, the same within measurement uncertainties or within 20%, 15%, 10% or 5% of each other, for example. With this arrangement, the grooves 128 may be manufactured more straightforwardly than in other cases in which the grooves 128 are formed at irregular intervals. Furthermore, this may make it easier to align the grooves with each other in a z-folding arrangement.

Some or all of the grooves may be formed using laser ablation. Laser ablation may refer to the removal of material from the stack 100 using a laser-based process. The removal of material may include any one of multiple physical processes. For example, the removal of material may include (without limitation) any one or a combination of melting, melt-expulsion, vaporisation (or sublimation), photonic decomposition (single photon), photonic decomposition (multi-photon), mechanical shock, thermo-mechanical shock, other shock-based processes, surface plasma machining, and removal by evaporation (ablation). Laser ablation for example involves irradiating a surface of a layer (or layers) to be removed with a laser beam. This for example causes a portion of the layer (or layers) to be removed. The amount of a layer removed by laser ablation may be controlled by controlling properties of the laser beam such as the wavelength of the laser beam or a pulse length of a pulsed laser beam. Laser ablation typically allows the formation of the groove to be controlled in a straightforward and rapid manner. However, in other examples, alternative methods may be used to form some or all of the grooves, such as photolithographic techniques.

In some embodiments in which laser ablation is used, the grooves 128 may be formed using at least one laser beam directed towards the first side of the substrate 102, which for example corresponds with the surface 126 of the substrate 102 on which the stack 100 is arranged. For example, the at least one laser beam may be directed towards the first side 130 of the stack 100. By virtue of directing the at least one laser beam towards the first side 130 of the stack 100, the at least one laser beam may thereby be directed towards the first side of the substrate 102. To direct at least one laser beam towards the first side of the substrate 102, a laser arranged to produce the at least one laser beam may itself be located at the first side of the substrate 102 (for example facing the first side 130 of the stack 100). Alternatively, though, the at least one laser beam may be located in a different position, but may nevertheless be directed towards the first side of the substrate 102 using a suitable optical arrangement. For example, the at least one laser beam may be produced using a laser ablation system comprising a laser and an optical element, such as a mirror or other reflector, to deflect at least one laser beam generated by the laser towards the first side of the substrate 102.

In this way, the grooves 128 may be formed by applying the at least one laser beam from a single side of the stack 100. This may simplify formation of the grooves 128 compared with cases in which laser beams are applied from different respective sides of the stack 100.

As can be seen from FIG. 3a, the first groove 128a, the second groove 128b and/or the third groove 128c may be formed without cutting the substrate 102. In some embodiments, the substrate 102 may be relatively thick compared to the stack 100. For example, a thickness of the substrate 102 in a direction perpendicular to a plane of the surface 126 of the substrate 102 is substantially the same as or larger than a thickness of the stack 100 in the same direction, where substantially the same, for example, refers to the thicknesses being precisely the same, the same within manufacturing tolerances or generally similar such as within 20%, 15%, 10% or 5% of each other. In such cases, it may be more straightforward to control a depth of a groove by cutting the groove from the first side 130 of the stack 100 without cutting the substrate 102, than cutting the groove through the substrate 102 and into the stack 100.

In FIG. 3a, the first and third grooves 128a, 128c are formed without cutting the first electrode layer 108 and the substrate 102. The second groove 128b is formed without cutting the substrate 102. This for example improves the efficiency of the formation of the grooves 128, while still producing grooves 128 with a shape or size that are appropriate for formation of an energy storage device, compared with other examples in which additional material is removed.

Figure 3B:
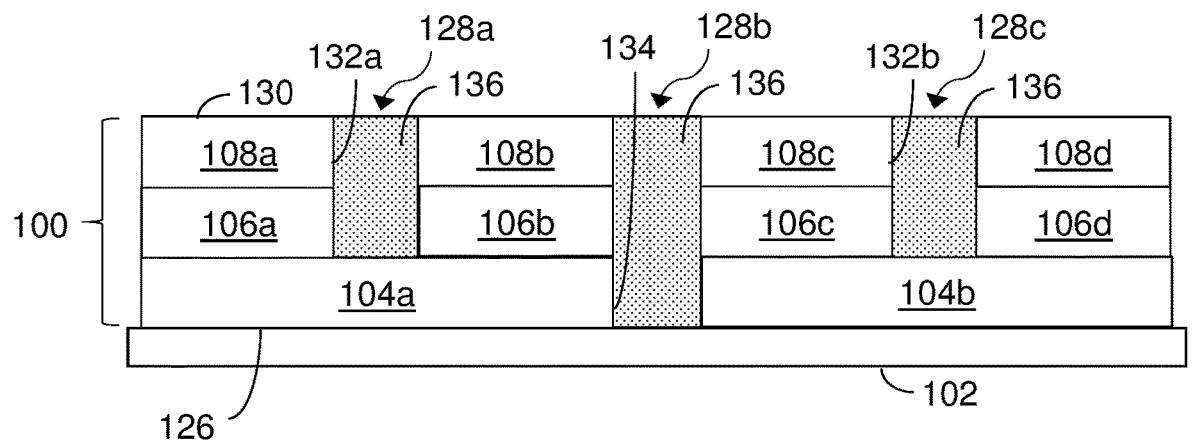

In FIG. 3b, an electrically insulating material 136 is deposited in the first, second and third grooves 128 (although in some cases electrically insulating material may not be deposited in one or more of the grooves 128). The electrically insulating material 136 may be provided as a first liquid, for example using an inkjet material deposition process, such as an inkjet printing process. This for example involves ejecting or otherwise propelling drops of the electrically insulating material 136, e.g. from nozzles, into the grooves 128. The electrically insulating material 136 may be an ink, such as a dielectric ink. A suitable dielectric ink is DM-INI-7003, available from Dycotec Materials Ltd., Unit 12 Star West, Westmead Industrial Estate, Westlea, Swindon, SN5 7SW, United Kingdom. In general, the electrically insulating material 126 may be any suitable dielectric material. A dielectric material is for example an electrical insulator which may be polarized upon application of an electric field. Such a dielectric material typically also has a low electrical conductivity. Although in FIG. 3b the same electrically insulating material 136 is deposited in each of the grooves 128, it is to be appreciated that, in other examples, a different electrically insulating material may be deposited in one or more of the grooves 128.

Depositing the electrically insulating material 136 in the first groove 128a insulates the first exposed surface 132a of the second electrode layer 108 from the first electrode layer 104. Similarly, depositing the electrically insulating material 136 in the second groove 128b insulates the exposed surface 134 of the first electrode layer 104 from the second electrode layer 108. Depositing the electrically insulating material 136 in the third groove 128c insulates the second exposed surface 132b of the second electrode layer 108 from the first electrode layer 104. In this way, the risk of short circuits between the first and second electrode layers 104, 108 may be reduced.

After providing the electrically insulating material 136 in the second groove 128b, a portion of the electrically insulating material 136 may be removed. This is shown schematically in FIG. 3c. The portion of the electrically insulating material 136 may be removed using the same apparatus or system as that used for formation of the grooves 128 or using different apparatus or system that nevertheless applies the same processing as that used to form the grooves 128. For example, the portion of the electrically insulating material 136 may be removed using laser ablation. However, other methods are possible. For example, a different method may be used to create the grooves 128 and to remove the portion of the electrically insulating material 136, as the skilled person will appreciate.

Figure 3C:
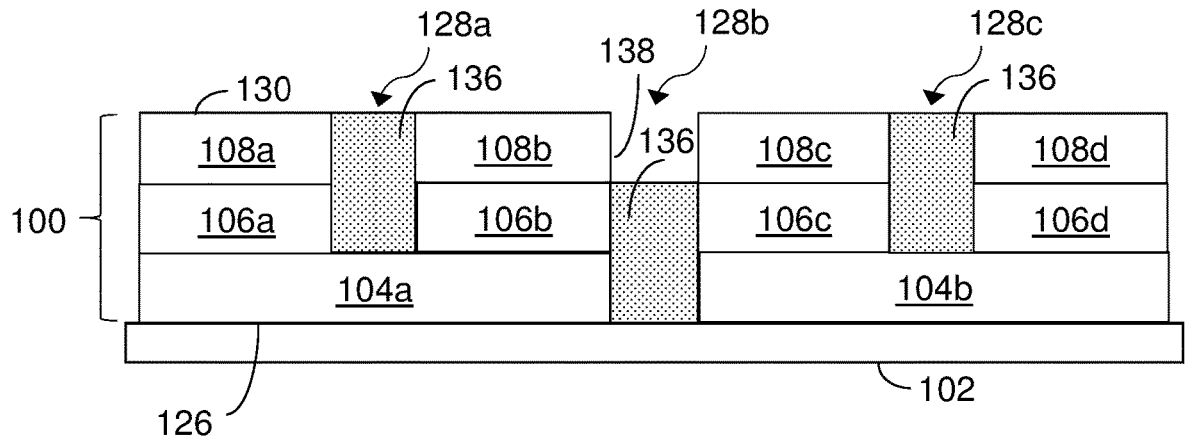

By removing the portion of the electrically insulating material 136, a third exposed surface 138 of the second electrode layer 108 is exposed. In FIG. 3c, the third exposed surface 138 of the second electrode layer 108 is a surface of the second portion 108b of the second electrode layer 108, although this is merely an example. In addition to exposing the surface of the second portion 108b of the second electrode layer 108, a surface of the third portion 108c of the second electrode layer 108 is also exposed in the example of FIG. 3c (although this need not be the case). An electrically conductive material may subsequently be deposited to contact the third exposed surface 138 of the second electrode layer 108, to connect the second electrode layer 108 to an external circuit.

Figure 3D:
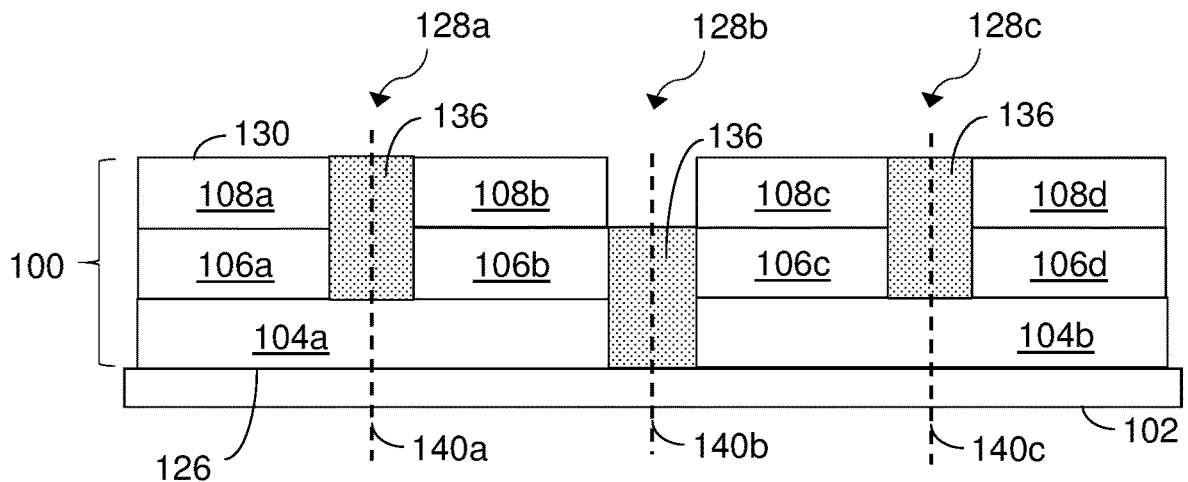

After deposition of the electrically insulating material 136, a cutting procedure may be applied, as shown in FIG. 3d. In FIG. 3d, an intermediate structure of the stack 100 and the substrate 126 is cut along a first axis 140a aligned with the first groove 128a, a second axis 140b aligned with the second groove 128b and a third axis 140c aligned with the third groove 128c. The axes may be referred to collectively with the reference numeral 140. In this example, the axes 140 are each aligned with a centre of a respective groove 128, although in other cases such axes may not be aligned in this way. As noted with reference to FIG. 2, the cutting operation may be performed using a laser, although this is merely an example. By cutting the intermediate structure in this way, the intermediate structure may be separated into individual cells.

Figure 3E:
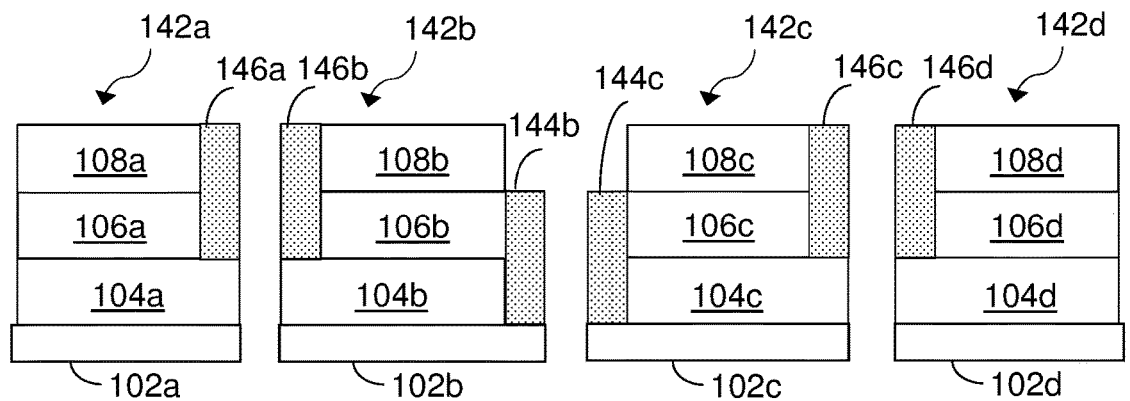

Cutting the intermediate structure as shown in FIG. 3d allows cells 142 for an energy storage device to be formed, as shown in FIG. 3e. In FIG. 3e, four cells 142a-142e are formed, although typically a much larger number of cells may be formed from a stack 100. The first cell 142a includes the first portion 108a of the second electrode layer 108 (which be considered to correspond to a second electrode), the first portion 106a of the electrode layer 106 (which may be considered to correspond to an electrolyte), the first portion 104a of the first electrolyte layer 104 (which may be considered to correspond to a first electrode), and a first portion 102a of the first substrate 102. The second, third and fourth cells 142b, 142c, 142d include similar layers to the first cell 142a. Components of the second, third and fourth cells 142b, 142c, 142d which are similar to corresponding components of the first cell 142a are labelled with the same reference numeral but appended by a "b", "c" or "d", respectively, rather than an "a".

In FIG. 3e, a first electrical insulator is in contact with an exposed surface of a portion of the first electrode layer 104 and an exposed surface of a portion of the electrolyte layer 106 without contacting at least a portion of an exposed surface of a portion the second electrode layer 108. The first electrical insulator is labelled in FIG. 3e with the reference numeral 144 appended by an "a", "b", "c" or "d" depending on whether it is associated with the first, second, third or fourth cell 142a-142d respectively. A second electrical insulator is in contact with an exposed surface of a portion of the second electrode layer 108 and an exposed surface of a portion of the electrolyte layer 106 without contacting at least a portion of an exposed surface of the first electrode layer 104. The second electrical insulator is labelled in FIG. 3e with the reference numeral 146 appended by an "a", "b", "c" or "d" depending on whether it is associated with the first, second, third or fourth cell 142a-142d respectively.

In FIG. 3e, the first cell 142a and the fourth cell 142d include second electrical insulators 146a, 146d but are lacking first electrical insulators. Nevertheless, the first and fourth cells 142a, 142d may undergo further processing to add a first electrical insulator, which may be similar to the first electrical insulators 144b, 144c of the second and third cells 142b, 142c.

The function of the first and second electrical insulators 144b, 146b will now be explained with reference to the second cell 142b. In FIG. 3e, the first electrical insulator 144b of the second cell 142b contacts an exposed surface of the second portion 104b of the first electrode layer 104b and an exposed surface of the second portion 106b of the electrolyte layer 106. The first electrical insulator 144b therefore insulates the second portion 104b of the first electrode layer 104b from the second portion 108b of the second electrode layer 108b. The second electrical insulator 146b of the second cell 142b also insulates the second portion 104b of the first electrode layer 104b from the second portion 108b of the second electrode layer 108b. However, the second electrical insulator 146b of the second cell 142b does this by contacting an exposed surface of the second portion 106b of the electrolyte layer 106 and an exposed surface of the second portion 108b of the second electrode layer 108.

In this example, the first electrical insulator 144b is arranged at a first side of the second cell 142b, and the second electrical insulator 146b is arranged at a second side of the second cell 142b, opposite to the first side. A side of a cell for example corresponds with a side of a stack of the cell. An electrical insulator may be considered to be arranged at a side of a cell or stack where the electrical insulator contacts at least a portion of an exposed surface of that side of the cell or stack. For example, the electrical insulator may extend along that side of the cell or stack (although it need not). In some embodiments, such as that of FIG. 3e, the first side of a cell or stack and the second side of the cell or stack may each substantially perpendicular to a plane of the surface 126 of the substrate 102. In such cases, the first or second side of the cell or stack need not itself be planar and may have a non-planar surface. Nevertheless, the first or second side may be generally or approximately perpendicular to the plane of the surface 126, such that a centre plane of the first or second side is perpendicular to the plane of the surface, precisely, within manufacturing tolerances or within 20 degrees, 15 degrees, 10 degrees or 5 degrees. In such cases, the first or second electrical insulators 144b, 146b may extend generally away from the surface 126 of the substrate 102. For example, the first or second electrical insulators 144b, 146b may extend approximately vertically, to cover a portion of a side face of the stack of the second cell 142b.

With this arrangement, an exposed surface of the second portion 104b of the first electrode layer 104 of the second cell 142b remains uncovered by the second electrical insulator 146b. An exposed surface of the second portion 108b of the second electrode layer 108 of the second cell 142b is also uncovered by the first electrical insulator 144b. In this way, the exposed portions of the first and second electrode layers 104, 108 are on opposite sides of the second cell 142b. This allows the first and second electrode layers 104, 108 to be connected to an external circuit by arranging electrically conductive material on opposite sides of the second cell 142b, and in contact with the exposed portions of the first and second electrode layers 104, 108. This therefore reduces the risk of short circuits between the first and second electrode layers 104, 108 occurring.

The third cell 142c of FIG. 3e is a mirror image of the second cell 142b. In this way, the second groove 128b of FIG. 3c can be filled with electrically insulating material 136 which, upon cutting, and division into two, forms the first electrical insulators 144b, 144c of the second and third cells 142b, 142c. The third cell 142c may be connected to an external circuit similarly to the second cell 142b.

A plurality of cells similar to the cells 142 of FIG. 3e may be connected in parallel to form a multi-cell energy storage device. For example, a first electrical connector may be used to connect each of a plurality of first electrode layers to each other, and a second electrical connector may be used to connect each of a plurality of second electrode layers to each other. The first and second electrical connectors may therefore provide contact points for terminals of an energy storage device. For example, the first and second electrical connectors may provide contact points for negative and positive terminals of the energy storage device, respectively. The negative and positive terminals may be electrically connected across a load to power the load, thereby providing a multi-cell energy storage device.

FIGS. 4a to 4f (collectively referred to as FIG. 4) are schematic diagrams which show a method of manufacturing an energy storage device according to further examples. Features of FIG. 4 which are similar to corresponding features of FIGS. 3a to 3e are labelled with the same reference number, incremented by 100. Corresponding descriptions are to be taken to apply. The same reference numerals are used to denote the same elements in each of FIGS. 4a to 4f. However, not all elements are labelled in each of FIGS. 4a to 4f, for clarity. Elements which are labelled in one of FIGS. 4a to 4f but not in another of FIGS. 4a to 4f may nevertheless be present, as the processing of FIGS. 4a to 4f may be applied sequentially to the same stack.

Figure 4A:
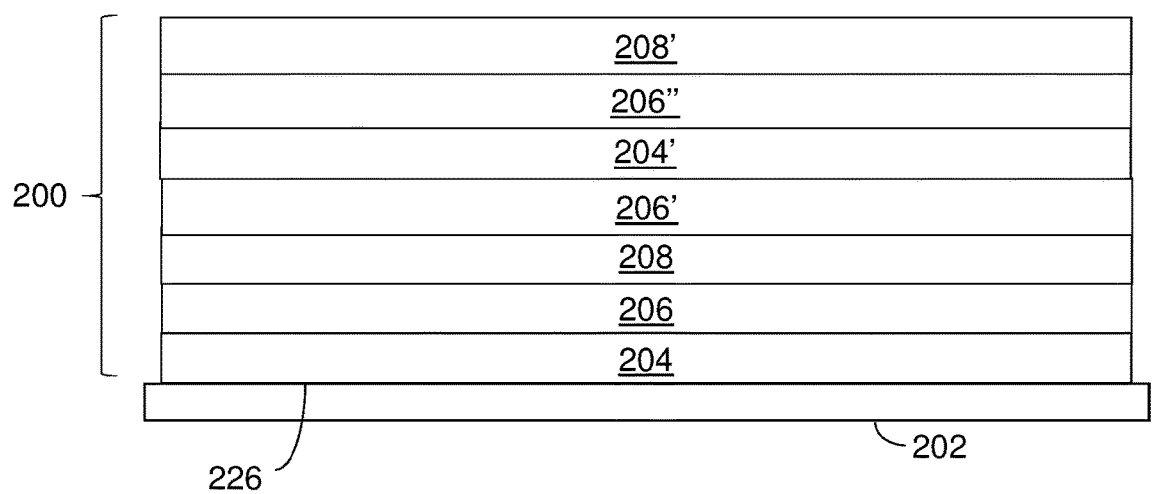
FIGS. 4a to 4f are schematic diagrams illustrating a method of manufacturing an energy storage device according to further embodiments.

In FIG. 4a, a stack 200 is provided on a substrate 202. The stack 200 includes a first electrode layer 204, an electrode layer 206, and a second electrode layer 208. However, the stack 200 also includes, on top of the second electrode layer 208, a further series of layers. In this example, the further series of layers includes a two further electrolyte layers 206', 206", a further first electrode layer 204' and a further second electrode layer 208'. A first further electrolyte layer 206' separates the further first electrode layer 204' from the second electrode layer 208. A second further electrolyte layer 206" separates the further second electrode layer 208' from the first electrode layer 204'. Elements of FIG. 4 with the same reference numeral but appended with an apostrophe ' or a double apostrophe " may be the same as corresponding element without this appendment. Corresponding descriptions are to be taken to apply.

Figure 4B:
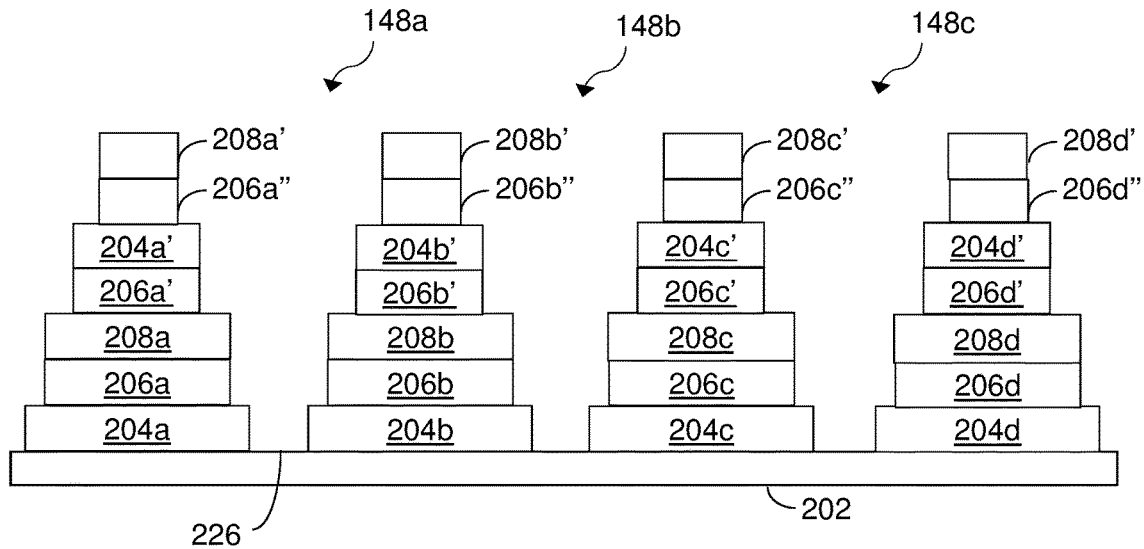

In FIG. 4b, first, second and third precursor grooves 148a, 148b, 148c are formed in a first side of the stack 200. The first, second and third precursor grooves 148a, 148b, 148c may be collectively referred to as precursor grooves 148. Similarly to FIG. 3, the first side of the stack 200 is for example opposite to a second side of the stack 200 which is in contact with a surface 226 of the substrate 202. A precursor groove is for example a groove which is formed, and which subsequently undergoes further processing (such as widening or partial filling with other elements) to form a subsequent groove. The precursor grooves may be formed using the same method or a similar method as that used for forming the grooves 128 of FIG. 3. For example, the precursor grooves may be formed using laser ablation or an alternative process such as photolithography.

Figure 4C:
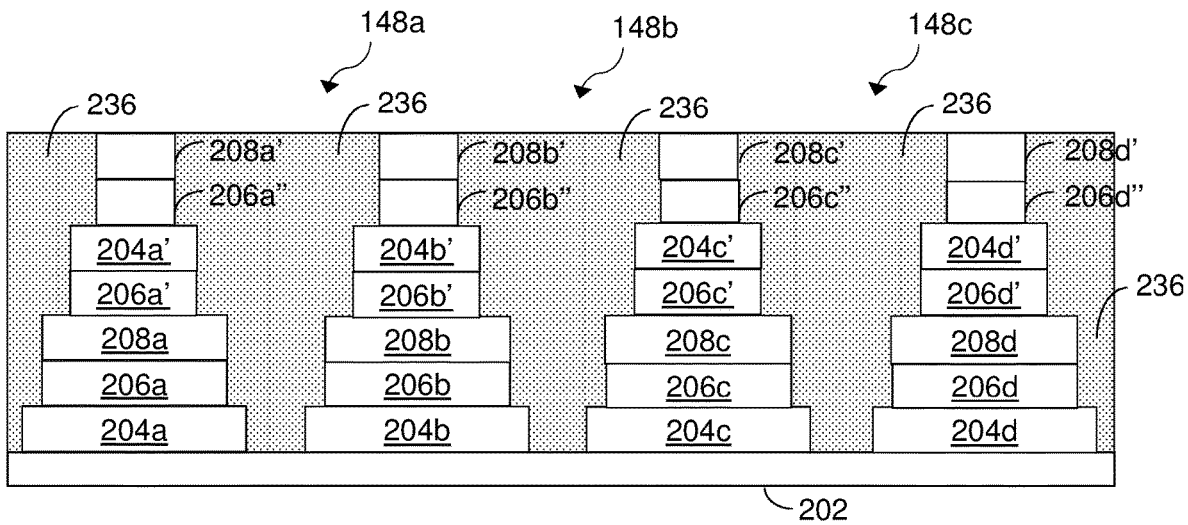

The precursor grooves 148 of FIG. 4*b* are formed with substantially the same depth as each other. This may simplify the formation of the precursor grooves 148. However, in other examples, one or more of the precursor grooves may be formed with a different depth than other precursor grooves. In FIG. 4*c*, each of the precursor grooves 148 is formed through the further second electrode layer 208', the second further electrolyte 206", the further first electrode layer 204', the first further electrolyte layer 206', the second electrode layer 208, the electrolyte layer 206, and the first electrode layer 204. However, in other examples, the precursor grooves 148 may be formed through different layers than this. Furthermore, in some cases, the stack 200 may include different layers than the stack 200 of FIG. 4. For example, the first further electrolyte layer 206' between the second electrode layer 208 and the further first electrode layer 206' may be omitted. A different layer (such as an insulating layer) may instead separate the second electrode layer 208 from the further first electrode layer 206'.

Figure 4D:
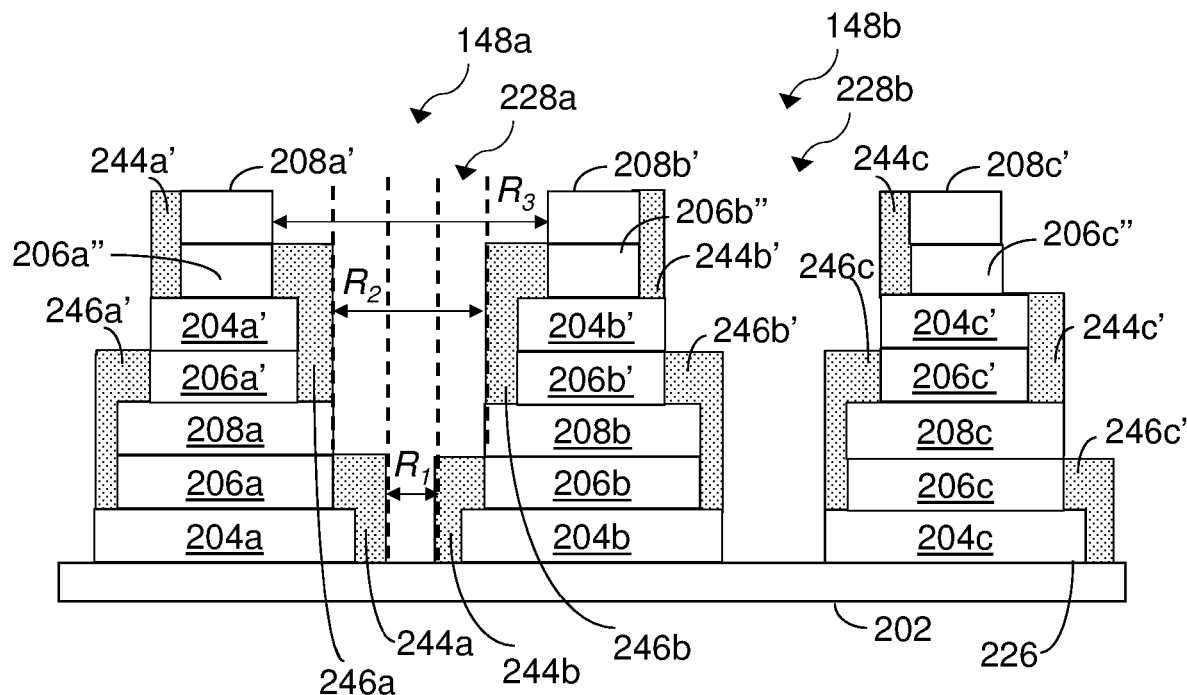

In some embodiments such as FIG. 4*b*, the precursor grooves 148 may have a stepped shape in cross-section, with a width of the precursor grooves increasing towards a mouth of the precursor grooves (for example in a direction away from the substrate 202). This allows particular layers to be revealed or otherwise exposed, e.g. for subsequent connection to electrically conductive material, as illustrated in FIG. 4*d*. However, the shape of the precursor grooves 148 of FIG. 4*b* is merely an example. In other embodiments, the precursor grooves 148 may have a different shape and/or size. For example, some or all of the precursor grooves 148 may instead have a constant cross-section, similarly to the grooves 128 of FIG. 3*a*.

FIG. 4*c* illustrates providing an electrically insulating material 236 in the precursor grooves 148. The electrically insulating material 236 may be provided as described with reference to FIG. 3*b*.

After providing the electrically insulating material 236, grooves 228 similar to the grooves 128 of FIG. 3 may be provided. This is shown schematically in FIG. 4*d*, which shows the formation of first and second grooves 228*a*, 228*b* (although it is appreciated that a third groove may be formed similarly to formation of the first groove 228*a*).

In FIG. 4*d*, the first groove 228*a* is formed through the electrically insulating material 236 in the first precursor groove 148*a*. The second groove 228*b* is formed through the electrically insulating material in the second precursor groove 148*b*. Although not shown in FIG. 4*d*, it is to be appreciated that the third groove may be formed through the electrically insulating material 236 in the third precursor groove 148*c* in a similar way to formation of the first groove 228*a*.

The electrically insulating material 236 removed to form the first and second grooves 228*a*, 228*b* of FIG. 4*d* may be removed in a similar way to removal of the electrically insulating material 136 to form the first and second grooves 128*a*, 128*b* of FIG. 3. For example, the first and second grooves 228*a*, 228*b* may be formed by laser ablating a portion of the electrically insulating material 236 or by using a different technique to remove the portion of the electrically insulating material 236.

The first groove 228*a* may be formed by first removing a first portion of the electrically insulating material 236 in a first region R1 of the first precursor groove 148*a* After removal of the first portion of the electrically insulating material 236, the electrically insulating material may be separated into first electrical insulators 244*a*, 244*b* which contact surfaces of first and second portions of the electrolyte layer 206*a*, 206*b* and surfaces of first and second portions of the first electrode layer 204*a*, 204*b*. In this way, the first electrical insulators 244*a*, 244*b* electrically insulate the first and second electrode layers 204, 208 from each other.

Subsequently, the first groove 228*a* may be widened by removing a second portion of the electrically insulating material 236 in a second region R2 of the first precursor groove 148*a*. The second region R2 is for example wider than the first region R1 in a direction parallel to a plane of the surface 226 of the substrate 202.

In the example of FIG. 4*d*, the second region R2 is sufficiently wide that removal of the second portion of the electrically insulating material 236 in the second region R2 exposes a surface of first and second portions 208*a*, 208*b* of the second electrode layer 208, within the first groove 228*a*. In this way, a first surface of the first groove 228*a* includes a first exposed surface of the second electrode layer 208, which in this case is an exposed surface of the first portion 208*a* of the second electrode layer 208.

Widening of the first groove 228*a* in this way leaves second electrical insulators 246*a*, 246*b* in contact with a surface of first and second portions 206*a'*, 206*b'* of the first further electrolyte layer 206, respectively, within the first groove 228*a*. The second electrical insulators 246*a*, 246*b* also respectively contact a surface of first and second portions 204*a'* 204*b'* of the further first electrode layer 204 within the first groove 228*a*. The second electrical insulators 246*a*, 246*b* also remain in contact, respectively, with a surface of first and second portions 206*a"*, 206*b"* of the second further electrolyte layer 206" within the first groove 228*a*. This electrically insulates the first and second portions 204*a'*, 204*b'* of the further first electrode layer 204' from the first and second portions 208*a*, 208*b* of the second electrode layer 208. In this way, surfaces of the first and second portions 204*a'*, 204*b'* of the further first electrode layer 204, which for example correspond with sides or faces of the further first electrode layer 204 facing the first groove 228*a*, are insulated from the first groove 228*a* by the electrically insulating material 236. Similarly, surfaces of the first and second portions 208*a'*, 208*b'* of the further second electrode layer 208, which for example correspond with sides or faces of the further first electrode layer 204 facing the first groove 228*a*, are insulated from the first groove 228*a* by the electrically insulating material 236. This surface of the first portion 208*a'* of the further second electrode layer 208 may be referred to as a first exposed surface of the further second electrode layer 208, as it may subsequently be exposed.

After removal of the second portion of the electrically insulating material 236, a third portion of the electrically insulating material 236 is removed in a third region R3 of the first precursor groove 148*a*. The third region R3 is for example wider than the first and second regions R1, R2 in a direction parallel to a plane of the surface 226 of the substrate 202. By removal of the third portion of the electrically insulating material 236 a surface of first and second portions 208*a'*, 208*b'* of the further second electrode layer 208' within the first groove 228*a* are exposed. This exposes the first exposed surface of the further second electrode layer 208, for example. This allows the further second electrode layer 208' to be connected to an external circuit, for example via electrically conductive material deposited in contact with the first exposed surface of the further second electrode layer 208'.

As can be seen from FIG. 4*d*, after widening the first groove 228*a*, a first portion of the first groove 228*a* (for example between the first and second portions 204*a*, 204*b* of the first electrode layer 204) is narrower than a second portion of the first groove 228*a* (for example between the first and second portions 204*a'*, 204*b'* of the further first electrode layer 204'). The first portion of the first groove 228*a* is for example closer to the substrate 202 than the second portion of the first groove 228*a*. Thus, the first groove 228*a* may for example widen in cross-section away from the substrate 202 (or towards a mouth of the first groove 228*a*). This may facilitate further processing of the stack 200, such as deposition of further components like an electrically conductive material. However, the shape of the first groove 228*a* of FIG. 4*d* is merely an example.

Similar processing may be applied to the second groove 228*b* as to the first groove 228*a*. However, as shown in FIG. 4*d*, a first portion of the electrically insulating material 236 removed during a first widening of the second groove 228*b* may be larger than the first portion of the electrically insulating material 236 removed during the first widening of the first groove 228*a*. In this way, an exposed surface of a second and third portion 204*b*, 204*c* of the first electrode layer 204 may be formed, within the second groove 228*b*, by removing the first portion of the electrically insulating material 236. For example, formation of the second groove 228*b* may include forming the second groove 228*b* through the electrically insulating material 236 in the second precursor groove 148*b* to form the second groove 228*b* with a second surface including an exposed surface of the first electrode layer 204 (which is for example the exposed surface of the second portion 204*b* of the first electrode layer 204). Conversely, a face or side of second and third portions 208*b*, 208*c* of the second electrode layer 208 may remain covered or otherwise insulated by the electrically insulating material 236 during formation of the second groove 228*b*. Similarly, a face or side of second and third portions 204*a'*, 204*b'* of the further first electrode layer 204*a'* may be remain insulated by the electrically insulating material 236. In this way, what may be referred to as an exposed surface of the further first electrode layer 204*a'* (such as a surface of the second portion 204*a'* of the further first electrode layer 204*a'*) may remain insulated from the second groove 228*b* by the electrically insulating material 236.

However, a second widening of the second groove 228*b*, for example by removal of a second portion of the electrically insulating material 236 may reveal an exposed surface of second and third portions 204*b'*, 204*c'* of the further first electrode layer 204' within the second groove 228*b*. In this way, the second surface of the second groove 228*b* may include the exposed surface of the further first electrode layer 204*a'*. A side or face of second and third portions 208*b'*, 208*c'* of the further second electrode layer 208 may remain covered or otherwise insulated by the electrically insulating material 236.

A third groove may be formed through the third precursor groove 228*c* in a similar way to formation of the first groove 228*a* through the first precursor groove 228*a*. Hence, after formation of the first, second and third grooves in a stack 200 such as the stack 200 of FIG. 4, the first surface of the first groove 228*a* may include a first exposed surface of the further second electrode layer 208' as well as a first exposed surface of the second electrode layer 208. Similarly, the second surface of the second groove 228*b* may include an exposed surface of the further first electrode layer 204' as well as an exposed surface of the first electrode layer 204. The third surface of the third groove may include a second exposed surface of the further second electrode layer 208' as well as a second exposed surface of the second electrode layer 208.

Figure 4E:
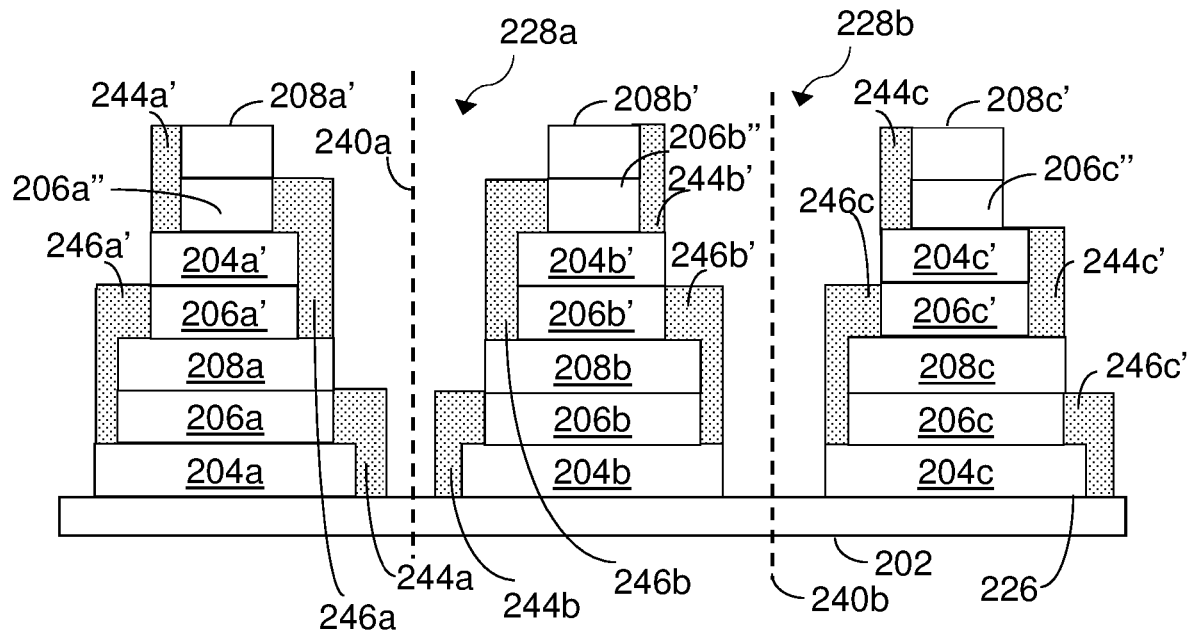

After formation of the first, second and third grooves in the stack 200, an intermediate structure of the stack 200 and the substrate 202 may be cut as shown in FIG. 4*e*. The cutting of the intermediate structure in FIG. 4*e* is similar to that of FIG. 3*d*. For example, the intermediate structure may be cut along first and second axes 240*a*, 240*b* (collectively referred to with the reference numeral 240) which are aligned with the first and second grooves 228*a*, 228*b* respectively. The intermediate structure may also be cut along a third axis aligned with the third groove.

Figure 4F:
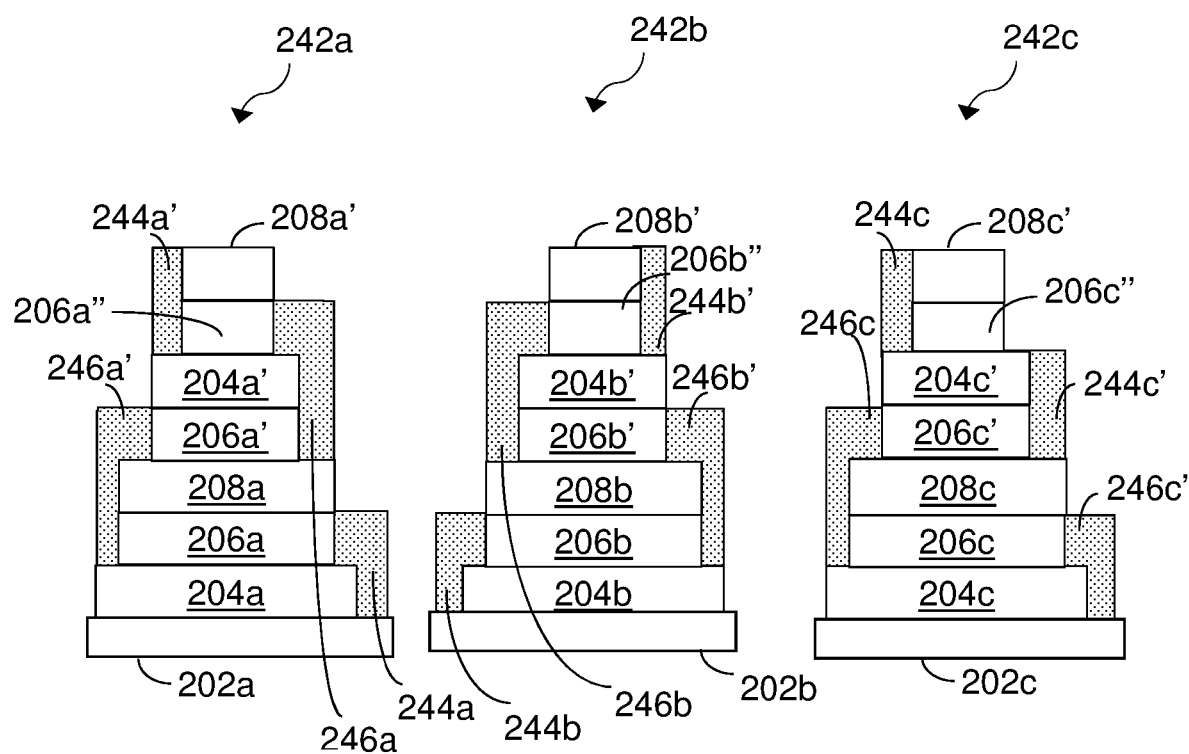

Cutting of the intermediate structure forms the three cells 242*a*-242*c* of FIG. 4*f*, collectively referred to with the reference numeral 242. The cells 242 may be connected together similarly to the connection of the cells 142 of FIG. 3*e* to form a multi-cell energy storage device.

Figure 5:
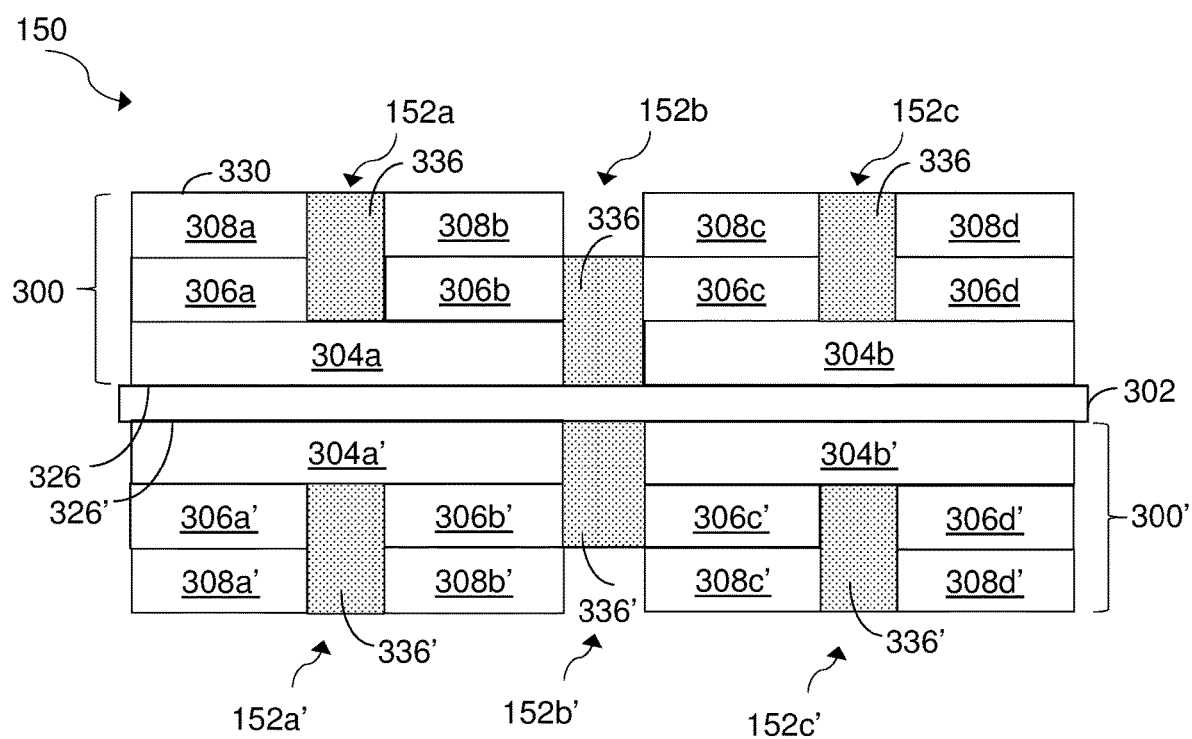
FIG. 5 is a schematic diagram of an intermediate structure for the manufacture of an energy storage device according to some embodiments.

FIG. 5 is a schematic diagram of an intermediate structure 150 for an energy storage device according to some embodiments. Features of FIG. 5 similar to corresponding features of FIG. 3 are labelled with the same reference numeral incremented by 200. Corresponding descriptions are to be taken to apply.

The intermediate structure 150 of FIG. 5 includes a first stack 300 on a first surface 326 of a substrate 302. The intermediate structure 150 also includes a second stack 300' on a second surface 326' of the substrate 302, opposite to the first surface 326. The first stack 300 is the same as stack 100 of FIG. 3. The second stack 300' is the same as the first stack 300. However, the second stack 300' is arranged on an opposite side of the substrate 302 than the first stack 300. For ease of reference, the first electrode layer 304*a'* of the second stack 300' may be referred to as a third electrode layer. Similarly, the second electrode layer 308' of the second stack 300' may be referred to as a fourth electrode layer.

The first and second stacks 300, 300' may each be manufactured as shown in FIG. 3, to form grooves 152, 152' in the first and second stacks 300, 300'. The grooves 152, 152' of the first and second stacks 300, 300' may be similar to the grooves 128 described with reference to FIG. 3. However, the grooves 152' in the second stack 300' may be formed from an opposite direction than the grooves 152 in the first stack 300. For example, the first stack 300 may be provided on the first surface 326 of the substrate 302, which may be considered to correspond to a first side of the substrate 302. Grooves 152 may then be formed in the first stack 300. In a similar manner, the second stack 300' may be provided on the second surface 326' of the substrate 302', which may be considered to correspond to a second side of the substrate 302. Grooves 152' may then be formed in the second stack 300'.

The grooves 152, 152' in the first and second stacks 300, 300' may be formed using laser ablation (as described with reference to FIG. 3) or another technique for removal of material. In cases in which the grooves 152, 152' are formed using laser ablation, the first and third grooves 152*a*, 152*b* may be formed using a first at least one laser beam directed towards a first side of the substrate 302, for example towards the first surface 326. In such cases, the second and fourth grooves 152*a'*, 152*b'* may be formed using a second at least one laser beam directed towards a second side of the substrate 302, opposite to the first side, such as towards the second surface 326'. The fifth and sixth grooves 152*c*, 152*c'* may also be formed using the first and second at least one laser beams, respectively.

The first and second at least one laser beams may be produced using separate laser ablation systems, respectively. For example, the first at least one laser beam may be generated by a first laser ablation system arranged at the first side of the substrate 302. Conversely, the second at least one laser beam may be generated by a second laser ablation system arranged at the second side of the substrate 302. This may be more straightforward than other arrangements, as it may obviate the need for complex optical apparatus to guide the first and second at least one laser beam to a desired position on the first and second sides of the substrate 302, respectively. The first and second laser ablation systems may be the same as each other, or different.

In other embodiments, though, both the first and second at least one laser beams may be generated using the same laser ablation system. For example, a laser ablation system may be arranged to generated laser pulses and to direct some of the laser pulses towards the first side of the substrate 302, and others towards the second side of the substrate 302. For example, an optical arrangement, which may for example include a beam splitter, or a mirror or other reflector, may be used to selectively deflect portions of a laser beam towards the first or second sides. In this way, the first and second at least one laser beams may be generated using a single laser ablation arrangement.

In FIG. 5, the intermediate structure includes a first groove 152a, a second groove 152a', a third groove 152b and a fourth groove 152b'. The first and third grooves 152a, 152b are formed through the first stack 300, and may be similar to the first and second grooves 128a, 128b of FIG. 3. The second and fourth grooves 152a', 152b' are formed through the second stack 300', and may also be similar to the first and second grooves 128a, 128b of FIG. 3 (but formed through the second stack 300' rather than the first stack 300). In this example, the intermediate structure also includes a fifth groove 152c in the first stack 300 and a sixth groove 152c' in the second stack 300', although the fifth and sixth grooves may be omitted in other examples. In FIG. 5, the third groove 152b is between the first and fifth grooves 152a, 152c in the first stack 300, and the fourth groove 152b' is between the second and sixth grooves 152a', 152c' in the second stack 300', although this is merely an example.

In some embodiments such as FIG. 5, a first depth of the first groove 152a differs from a third depth of the third groove 152b (where each of these depths may be taken in the same direction as the depths d1, d2, d3 of the grooves 128 of FIG. 3). Similarly, a second depth of the second groove 152a' may differ from a fourth depth of the fourth groove 152b'. This therefore allows surfaces of different layers to be exposed on opposite sides of the first and second stacks 300, 300' after subsequent processing (described further with reference to FIG. 11). In FIG. 5, a fifth depth of the fifth groove 152c is substantially the same as the first depth of the first groove 152a, and a sixth depth of the sixth groove 152c' is substantially the same as the second depth of the second groove 152a'. However, this need not be the case.

In the example of FIG. 5, the first groove 152a is in substantial alignment with the second groove 152a', and the third groove 152b is in substantial alignment with the fourth groove 152b'. In FIG. 5, the fifth groove 152c is also in substantial alignment with the sixth groove 152c', although this need not be the case. Two grooves may be considered to be in substantial alignment with each other where they extend or lie along a common axis, or where one of the grooves at least approximately overlaps the other groove. For example, such grooves may lie in a straight line with each other, in cross-section. An example of this is shown in FIG. 5, in which the first and second grooves 152a, 152a' are each elongate in a vertical direction, and are stacked one on top of the other (albeit separated by the first electrode layers 304a, 304a' of the first and second stacks 300, 300' and the substrate 302) so that the first groove 152a overlaps the second groove 152a'.

In FIG. 5, the first and second stacks 300, 300' are the same as each other, and aligned with each other, but on opposite sides of the substrate 302. Hence, the first, third and fifth depths of the first, third and fifth grooves 152a, 152b, 152c of the first stack 300 are substantially the same as the second, fourth and sixth depths of the second, fourth and sixth grooves 152a', 152b', 152c' of the second stack 300'. However, in other cases, one or more the grooves 152 of the first stack 300 may have a different depth than one or more grooves 152' of the second stack 300'. For example, grooves which are aligned with each other, but in different respective stacks, may have different depths than each other. For example, the first depth may be substantially the same as the fourth depth, and the third depth may be substantially the same as the second depth. This may be the case for example where the first and second grooves are substantially aligned with each other, and where the third and fourth grooves are substantially aligned with each other, or in other examples in which the alignment between the grooves of the first stack and the grooves of the second stack differs from that shown in FIG. 5.

Figure 6:
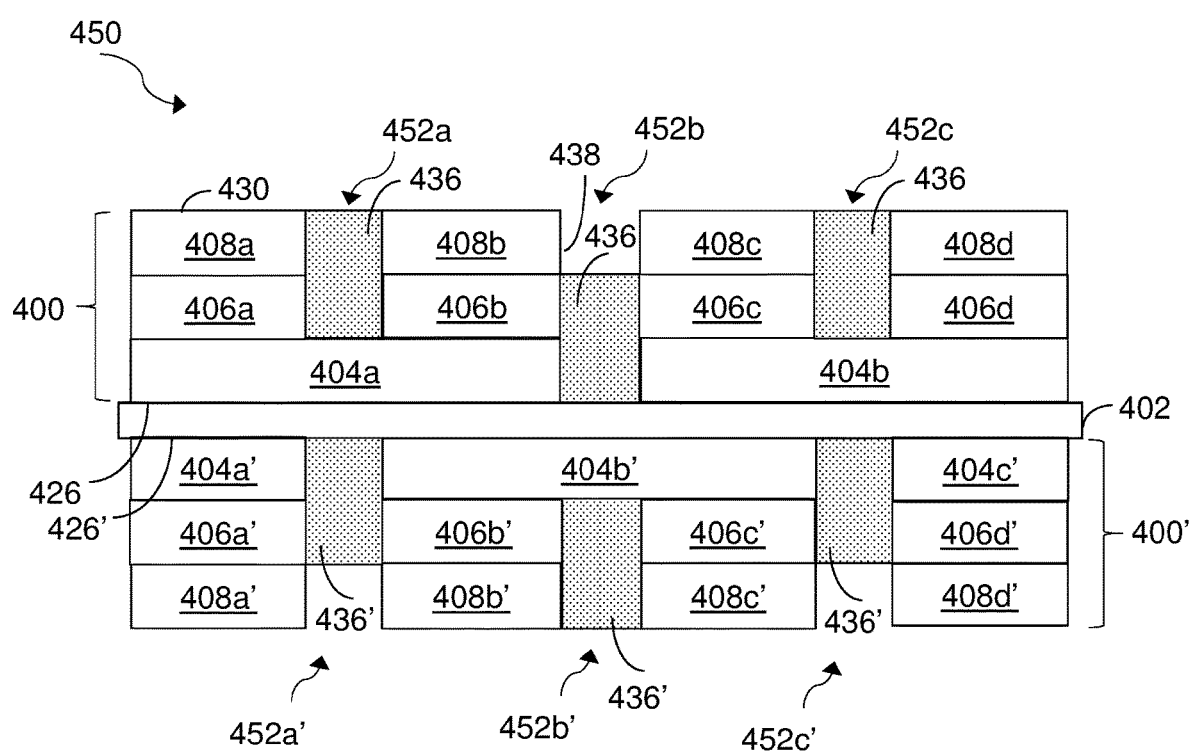
FIG. 6 is a schematic diagram of an intermediate structure for the manufacture of an energy storage device according to further embodiments.

FIG. 6 shows a further example of an intermediate structure 450 for the manufacture of an energy storage device. Features of FIG. 6 which are similar to corresponding features of FIG. 5 are labelled with the same reference numeral, but prepended by a "4" rather than a "1" or a "3".

The intermediate structure 450 of FIG. 6 is similar to that of FIG. 5. The first stack 400 of FIG. 6 is the same as the first stack 300 of FIG. 5, and is also arranged on the first surface 426 of the substrate 402. However, the second stack 400' of FIG. 6, which is arranged on the second surface 426' of the substrate 402, differs from the second stack 300' of FIG. 5.

In particular, the second stack 300' of FIG. 5 is a mirror image of the first stack 300 of FIG. 5. Hence, the first, third and fifth depths of the first, third and fifth grooves 152a, 152b, 152c of the first stack 300 are substantially the same as the second, fourth and sixth depths of the second, fourth and sixth grooves 152a', 152b', 152c' of the second stack 300, respectively. In contrast, the first depth of the first groove 452a of the first stack 400 of FIG. 6 is different from a second depth of the second groove 452a' of the second stack 400'. The first groove 452a is substantially aligned with the second groove 452a', but on opposite sides of the substrate 402.

The third and fifth grooves 452b, 452c of the first stack 400 are also aligned with the fourth and sixth grooves 452b', 452c' of the second stack 400 in the example of FIG. 6. The third and fifth depths of the third and fifth grooves 452b, 452c of the first stack 400 are different from the fourth and sixth depths of the second and sixth grooves 452b', 452c' respectively, in this case. However, this need not be the case. Indeed, other examples may include a plurality of aligned pairs of grooves (with each pair including a groove in the first stack and a groove in the second stack, which is aligned with the groove in the first stack). In such cases, some pairs of grooves may have substantially the same depth as each other. Other pairs may include two grooves with different depths than each other.

The second, fourth and sixth grooves 452a', 452b', 452c' of FIG. 6 may be formed similarly to the formation of the second, fourth and sixth grooves 152a', 152b', 152c' of FIG.

5, but with different respective depths. For example, the first groove 452a of FIG. 6 may be formed without cutting the first electrode layer 404 of the first stack 400 or the substrate 402, such that the first groove 452a is formed through the second electrode layer 408 and the electrolyte layer 406, without extending into the first electrode layer 404 in the first stack 400. In contrast, the second groove 452a' of FIG. 6 may be formed without cutting the substrate 402. However, the second groove 452a' may be formed through the second electrode layer 408', the electrolyte layer 406' and the first electrode layer 404' of the second stack 400'. In this way, the second groove 452a' may separate the first electrode layer 404' of the second stack 400' into a first portion 404a' and a second portion 404b'. The second groove 452a' in such cases also separates a first portion 406a' of the electrolyte layer 406' from a second portion 406b' of the electrolyte layer 406', and a first portion 408a' of the second electrode layer 408' from a second portion 408b' of the second electrode layer 408' in the second stack 400'.

Similarly, the third groove 452b of FIG. 6 may be formed through the second electrode layer 408, the electrolyte layer 406 and the first electrode layer 404 of the first stack 400 (for example without cutting the substrate 402). However, the fourth groove 452b' of FIG. 6 may be formed through the second electrode layer 408' and the electrolyte layer 406' of the second stack 400' without cutting the first electrode layer 404' of the second stack 400' or the substrate 402. In this way, the fourth groove 452b' separates the second portion 406b' of the electrolyte layer 406' from a third portion 406c' of the electrolyte layer 406' in the second stack 400'. The fourth groove 452b' also separates the second portion 408b' of the second electrode layer 408' from a third portion 408c' of the second electrode layer 408c' in the second stack 400'.

In FIG. 6, the fifth groove 452c is formed through the second electrode layer 408 and the electrolyte layer 406 of the first stack 400, without cutting the first electrode layer 404 of the first stack 400 and the substrate 402. The sixth groove 452c' is formed through the second electrode layer 408', the electrolyte layer 406' and the first electrode layer 404' of the second stack 400'. The sixth groove 452c' therefore separates the second portion 404b' of the first electrode layer 404' from a third portion 404c' of the first electrode layer 404' in the second stack 400'. The sixth groove 452c' also separates the third portion 406c' of the electrolyte layer 406' from a fourth portion 406d' of the electrolyte layer 406', and the third portion 408c' of the second electrode layer 408' from a fourth portion 408d' of the second electrode layer 408' in the second stack 400'.

After formation of an intermediate structure such as that illustrated in FIG. 5 or 6, further processing may be applied to the intermediate structure (as noted with reference to FIG. 2). In some embodiments, the further processing of the intermediate structure may include cutting the intermediate structure into one or more ribbons before folding the intermediate structure.

Figure 7:
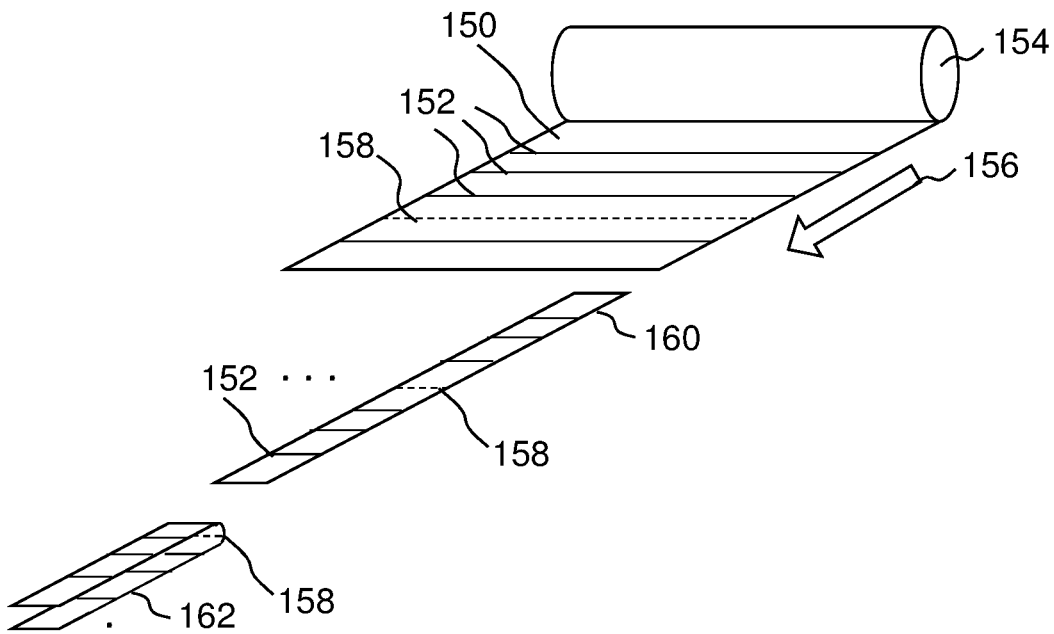
FIG. 7 is a schematic diagram illustrating an example of processing of an intermediate structure in a reel-to-reel process.

For example, referring specifically now to FIG. 7, there is illustrated schematically an example of further processing of the intermediate structure 150 of FIG. 5 in a reel-to-reel type process. As illustrated in FIG. 7, the intermediate structure 150 is provided from a reel 154 so as to travel in a first direction 156. The grooves 152 in the first stack 300 in the intermediate structure 150 are visible in FIG. 7. However, the intermediate structure 150 also includes grooves 152' in the second stack 300', as shown in FIG. 5. The intermediate structure 150 is shown in plan view in FIG. 7. Hence, the second stack 300' (which is beneath the first stack 300) is obscured in FIG. 7. The intermediate structure 150 of FIG. 7 also includes a registration feature 158. A registration feature is for example different from the grooves of a stack. For example, a registration feature may be a recess in a stack, which for example extends only partway through an upper layer of a stack (rather than through at least one layer of the stack). A registration feature in such cases may have a different size or shape than a groove in a stack. A registration feature typically indicates a fold point at or towards which a stack (or an intermediate structure including a stack) is to be folded. Folding the intermediate structure may allow for efficient segmentation of the intermediate structure into battery cells. A registration feature may be formed by laser ablation or other methods. For example, a registration feature may be formed by depositing a material, e.g. printing a material, on a stack. As another example, the registration feature may be formed by scribing or forming some other mark (e.g. not necessarily using laser ablation) in the stack. In the example illustrated in FIG. 7, the grooves 152 and the registration feature 158 (which in this example takes the form of a recess parallel to the grooves 152) are elongate in a direction perpendicular to the first direction of travel 156. Other registration features are possible in other examples though. Furthermore, in some cases, a registration feature may be omitted.

As illustrated schematically in FIG. 7, the intermediate structure 150 may be cut into a plurality of ribbons 160 (only one is shown in FIG. 7). For example, the ribbons 160 may be formed by laser cutting the intermediate structure 150 along a direction parallel to the first direction of travel 156. Each ribbon 156 is elongate in a direction perpendicular to the length of the grooves 152. Each ribbon 156 may then be folded at or towards the registration feature 158 (for example in a folding process and/or by the folding machine as described) to create a folded intermediate structure 162. By forming the registration feature 158 a fold point at which the ribbon 156 is folded may be efficiently and reliably identified. For example, the intermediate structure 150 may be processed by a folding machine, and the registration feature 158 may provide a means by which the folding machine can efficiently register (i.e. identify and/or align with) a point at which the intermediate structure 150 is to be folded, for example, without having to count the number of grooves between each fold.

It will be appreciated that although only one fold is illustrated in FIG. 7, in other examples there may be many folds such that the folded intermediate structure 162 comprises many stacks, for example dozens or hundreds of stacks.

Figure 8:
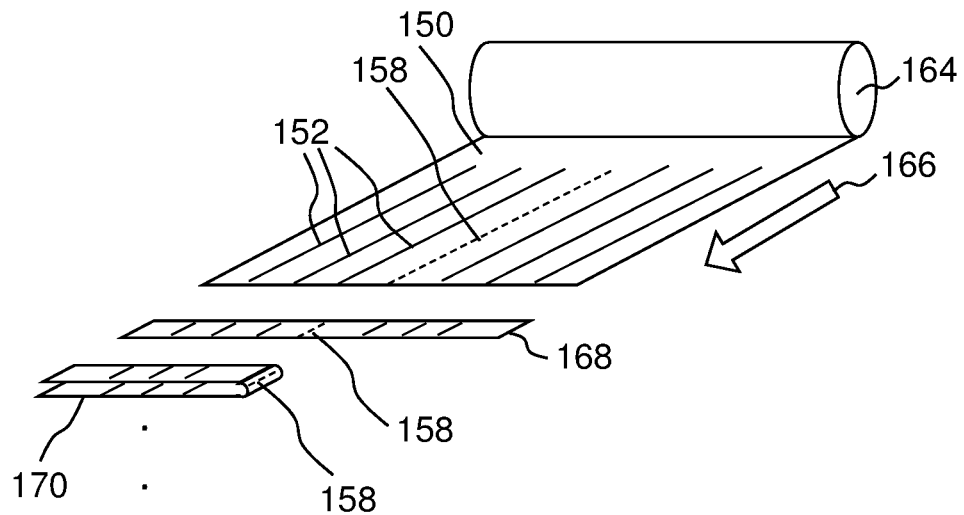
FIG. 8 is a schematic diagram illustrating a further example of processing of an intermediate structure in a reel-to-reel process.

As another example, referring now to FIG. 8, there is illustrated schematically another example of further processing of the intermediate structure 150. As illustrated in FIG. 8, the intermediate structure 150 is provided from a reel 164 so as to travel in a second direction 166. The intermediate structure 150 is for example the same as the intermediate structure 150 provided from the reel 154 of FIG. 7. However, in FIG. 8, the grooves 152 and the registration feature 158 (which in this example takes the form of a recess parallel to the grooves 152) are elongate in a direction parallel to the second direction of travel 166. Forming the grooves 152 and/or the registration feature 158 in this orientation may allow for the laser source(s) and/or ablation beams produced thereby to be provided from a static laser system relative to which the intermediate structure 150 may be moved, for example to form the grooves 152 and/or the registration feature 158 in a substantially continuous process, which may be efficient. Similarly, the grooves 152' of the second stack 300' (which are not visible in FIG. 8) may be overlapped by the grooves 152 of the first stack 300. The grooves 152' of the second stack 300' may also be elongate in a direction parallel to the second direction of travel 166. Hence, a laser source or ablation beam for forming the grooves 152' in the second stack 300' may also be stationary with respect to the intermediate structure 150. As described with reference to FIG. 5, a separate or a combined laser system may be used to form the grooves 152, 152' in the first and second stacks 300, 300' respectively.

As illustrated schematically in FIG. 8, the intermediate structure 150 may be cut into a plurality of ribbons 168 (only one is shown in FIG. 8). For example, the ribbons 168 may be formed by laser cutting the intermediate structure 150 along a direction perpendicular to the second travel direction 166. Again, each ribbon 168 is elongate in a direction perpendicular to a plane of the grooves 152 in the first stack 300. Each ribbon 168 may then be folded at or towards the registration feature 158 (for example in a folding process and/or by the folding machine) to create a folded intermediate structure 170. It will be appreciated that although only one fold is illustrated in FIG. 8, in other examples there may be many folds such that the folded intermediate structure 170 comprises many stacks, for example dozens or hundreds of stacks.

It will be appreciated that, in some examples, the folded intermediate structure 162 of FIG. 7 may be substantially the same as (e.g. indistinguishable from) the folded intermediate structure 170 of FIG. 8. However, cutting of the intermediate structure 150 substantially parallel to the second direction of travel 166 as per FIG. 8 may allow for parallel processing of each of the ribbons 168 that are produced, and hence may allow for an efficient production process.

A cutting apparatus (not shown) arranged to cut the intermediate structure 150 to form the ribbons 160, 168 may be provided. The cutting apparatus may form part of an apparatus for forming the grooves 152, 152' in the first and second stacks 300, 300' and/or a folding machine, or may be a separate apparatus. For example, the cutting apparatus may include a laser cutter arranged to cut the intermediate structure 150 into the ribbons 160, 168. The folding machine (not shown) may include a means for recognising or identifying the registration feature(s) 158. For example, the recognising means may comprise a camera or other sensor arranged to recognise the registration feature 158 of the intermediate structure 150 as distinct from the grooves 152 of the first stack 300. The folding machine being arranged to fold the intermediate structure 150 at or towards the identified registration mark may allow the folding machine to fold intermediate structure 150 reliably and efficiently, for example without having to count the number of grooves between each fold. However, this is merely an example, and other folding machines may be used in other examples.

Figure 9:
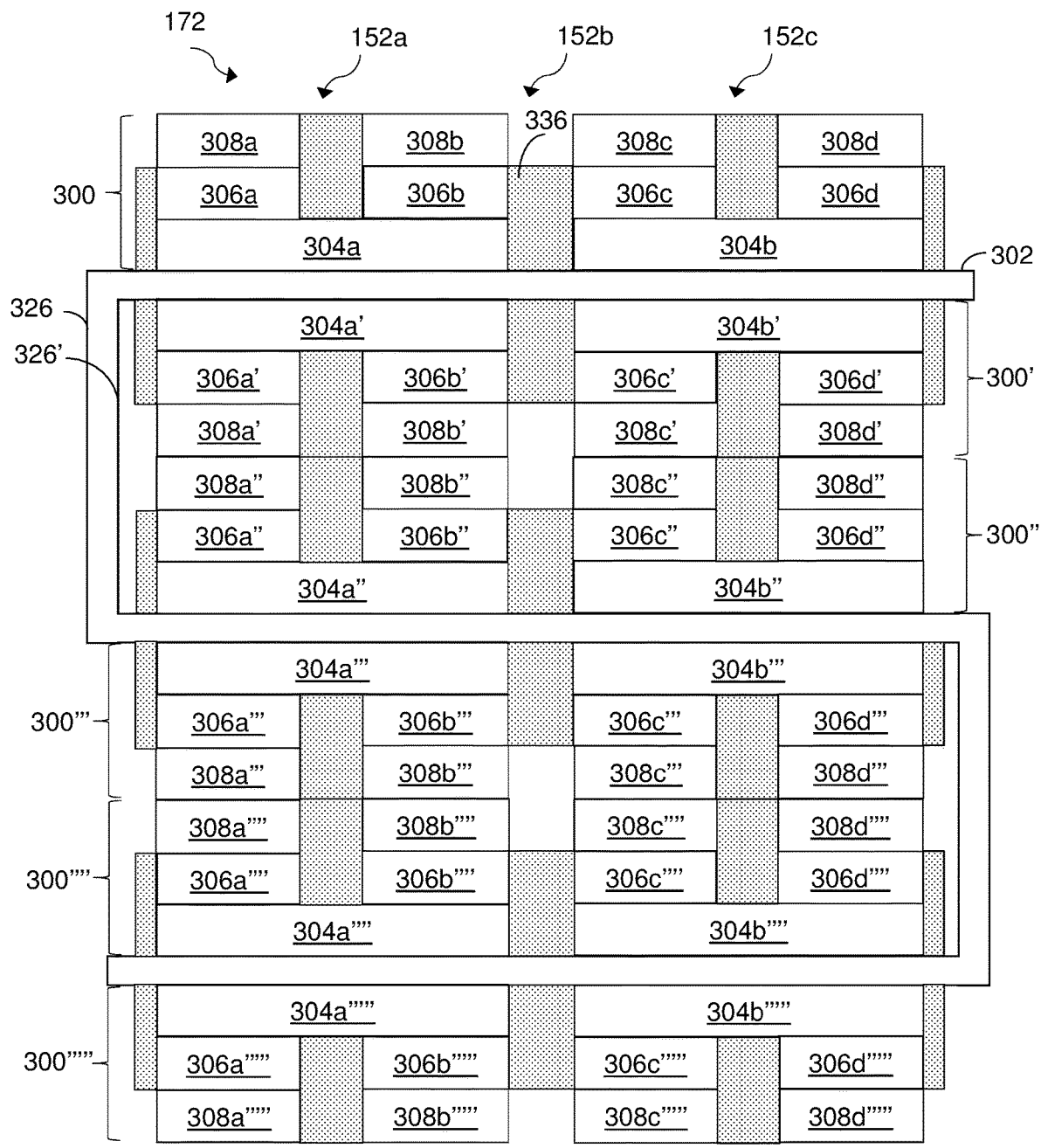
FIG. 9 is a schematic diagram illustrating a folded intermediate structure for an energy storage device according to some embodiments.

FIG. 9 is a schematic diagram illustrating a folded intermediate structure 172 for an energy storage device according to examples. The folded intermediate structure 172 of FIG. 9 is obtained by folding the substrate 302, which is the same as the substrate 302 of FIG. 5. A first, second, third, fourth, fifth, and sixth stack 300, 300', 300", 300'", 300"", 300""" are arranged on the substrate 302 of FIG. 9. The first and second stacks 300, 300' are the same as the first and second stacks 300, 300' of FIG. 5. Corresponding descriptions are to be taken to apply. Indeed, each of the stacks 300-300""" of FIG. 9 is the same as each other stack, and merely differs in its respective position with respect to the substrate 302. Hence, features of the second stack 300' which are the same as corresponding features of the first stack 300 are labelled with the same reference numeral appended by an apostrophe '. Features of the third stack 300" which are the same as corresponding features of the first stack 300 are labelled with the same reference numeral appended by two apostrophes ". Features of the fourth stack 300'" which are the same as corresponding features of the first stack 300 are labelled with the same reference numeral appended by three apostrophes '". Features of the fifth stack 300"" which are the same as corresponding features of the first stack 300 are labelled with the same reference numeral appended by four apostrophes "". Features of the sixth stack 300""" which are the same as corresponding features of the first stack 300 are labelled with the same reference numeral appended by five apostrophes """.

The first, fourth and fifth stacks 300, 300'", 300"" are arranged on the first surface 326 of the substrate 302. The second, third and sixth stacks 300', 300", 300""" are arranged on the second surface 326' of the substrate 302, which is opposite to the first surface 326.

The folded intermediate structure 172 may therefore be similar to or the same as the folded intermediate structures 162, 170 of FIGS. 7 and 8. The folded intermediate structure 172 of FIG. 9 may be obtained after cutting the intermediate structure 150 into ribbons 160, 168 as shown in FIGS. 7 and 8 (although this need not be the case). For example, the folded intermediate structure 172 may be obtained by folding the intermediate structure 150 a plurality of times, for example as shown in FIGS. 7 and 8.

In the example of FIG. 9, the folded intermediate structure 172 is folded in a z-fold arrangement. In other words, the second stack 300' is folded beneath the first stack 300. The third stack 300" is folded beneath the second stack 300'. The fourth stack 300'" is folded beneath the third stack 300". The fifth stack 300"" is folded beneath the fourth stack 300'". The sixth stack 300""" is folded beneath the fifth stack 300"". With this arrangement, planes defined by layers of each of the stacks 300-300""" are substantially parallel with one another. However, due to the folding of the substrate 302, the second stack 300' is inverted compared to the first stack 300. Similarly, the fourth stack 300'" is inverted compared to the third stack 300" and the sixth stack 300""" is inverted compared to the fifth stack 300"". The first, third and fifth stacks 300, 300", 300"" are arranged in the same orientation as each other but in different respective planes, which are for example substantially parallel to each other. Two planes may be considered to be substantially parallel to each other where they are exactly parallel to each other or where they are parallel to each other within manufacturing tolerances, or within less than 20 degrees, 15 degrees, 10 degrees or 5 degrees.

A distance between each of the folds is substantially the same, for example exactly the same, the same within manufacturing tolerances, or with a deviation of less than 20%, 15%, 10% or 5%. For example, a folding point may be equally spaced along a length of an intermediate structure including the stacks 300-300""", such as along a length of the ribbons 160, 168. In this way, each of the stacks 300-300""" may be of the same width as each other, so that the stacks 300-300""" register or align with each other.

Figure 10:
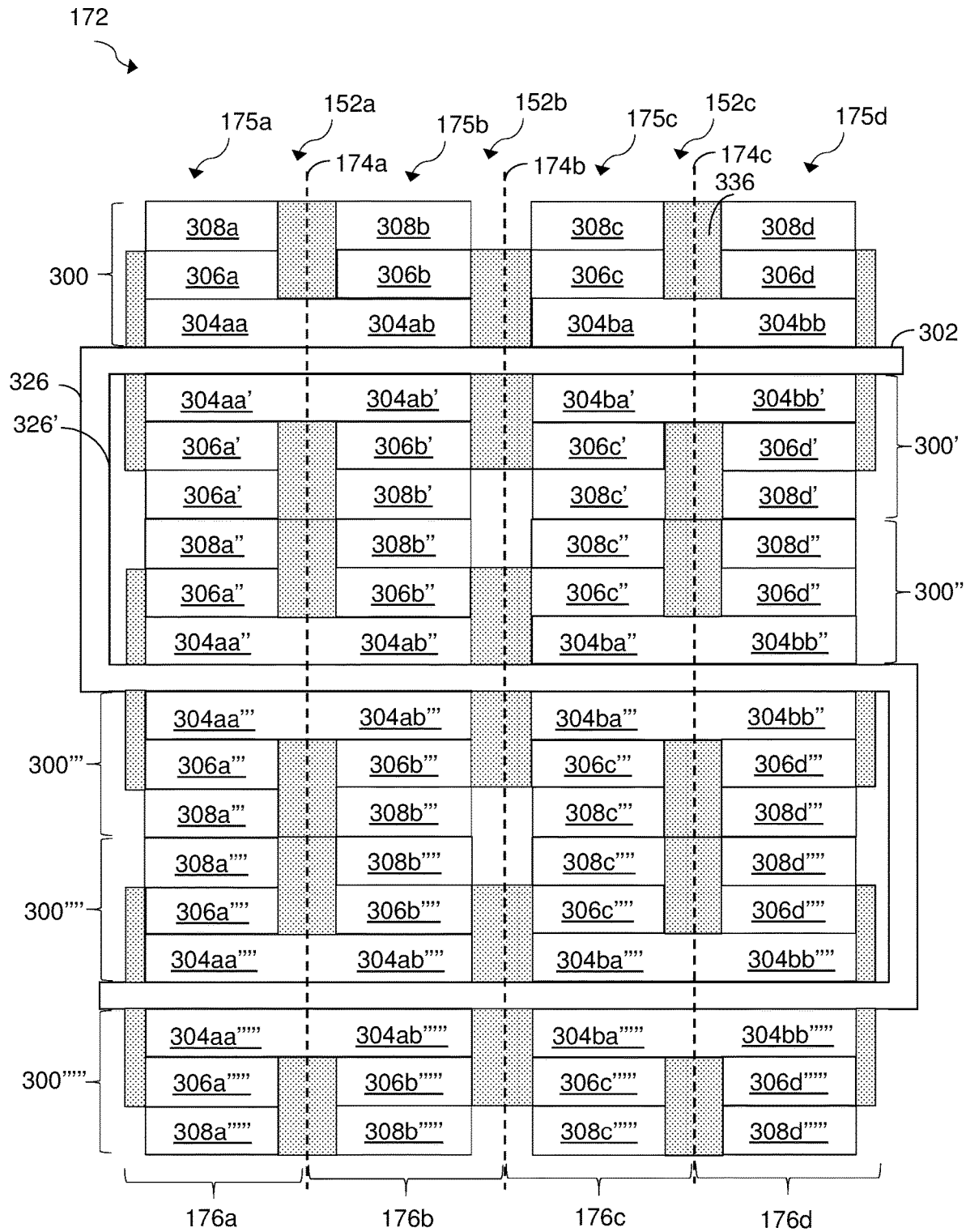
FIG. 10 is a schematic diagram illustrating cutting of the folded intermediate structure of FIG. 9.

The folded intermediate structure 172 may subsequently be segmented as shown in FIG. 10. As can be seen from FIG. 10, each of the stacks 300-300""" are aligned with one another, e.g. such that grooves in one of the stacks (which are each filled with insulating material 336 in FIG. 10) are aligned (e.g. vertically aligned in the sense of FIG. 10), with corresponding grooves of an adjacent stack. A first axis 174a corresponding to the first groove 152a of the first stack 300 is aligned with a centre of the first groove 152a of the first stack 300, and extends in a vertical direction with reference to FIG. 10. Similarly, a second axis 174b of FIG. 10 corresponds to a central axis of the third groove 152b of the first stack 300, and a third axis 174c of FIG. 10 corresponds to a central axis of the fifth groove 152c of the first stack 300.

For example, after folding the substrate 302, the first groove 152a of the first stack 300 is between a first portion 175a of the first stack 300 on a first portion of the first surface 326 of the substrate 302 and a third portion 175b of first stack 300 on a third portion of the first side of the substrate 302 in substantially the same plane as the first portion of the first stack 300. The first portion 175a of the first stack 300 includes the first portions of the second electrode layer 308a and the electrolyte layer 306a of the first stack 300. The first portion 175a of the first stack 300 also includes a first subportion 304aa of the first portion 304a of the first electrode layer 304 of the first stack 300. The first subportion 304aa is for example a section of the first portion 304a of the first electrode layer 304 to the left of the first axis 174a in FIG. 10. In FIG. 10, the third portion 175b of the first stack 300 includes the second portions of the second electrode layer 308b and the electrolyte layer 306b, as well as a second subportion 304ab of the first portion 304 of the first electrode layer 304 of the first stack 300.

The second groove 152b separates the third portion 175b of the first stack 300 from a fourth portion 175c of the first stack 300, which includes the third portions of the second electrode layer 308c and the electrolyte layer 306c of the first stack 300. The fourth portion 175c of the first stack 300 also includes a first subportion 304ba of the second portion 304b of the first electrode layer 304 of the first stack 300.

Similarly, the third groove 152c separates the fourth portion 175c of the first stack 300 from a fifth portion 175d of the first stack 300, which includes the fourth portions of the second electrode layer 308d and the electrolyte layer 306d of the first stack 300. The fifth portion 175d of the first stack 300 also includes a first subportion 304ba of the second portion 304b of the first electrode layer 304 of the first stack 300.

In FIG. 10, the folded intermediate structure 172 is cut along the first axis 174a, which may be considered to be a longitudinal axis in substantial alignment with the first groove 152a. The axis along which the folded intermediate structure 172 is cut may extend through an entirety of the folded intermediate structure 172, so as to separate the folded intermediate structure into a plurality of multi-stack structures. Each of the multi-stack structures may be considered to correspond to a precursor to a respective energy storage device. For example, cutting the folded intermediate structure 172 along the first axis 174a may separate a first precursor 176a to a first energy storage device from a second precursor 176b to a second energy storage device. In FIG. 10, the first precursor 176a includes a portion of each of the stacks 300-300'''' in substantial alignment with each other. The first precursor 176a includes the first portion 175a of the first stack 300, as well as a portion of each of the other stacks 300'-300'''' which is overlapped by the first portion 175a of the first stack 300.

In the example of FIG. 10, it can be seen that the folded intermediate structure 172 includes a first portion of the second stack 300' on a first portion of the second surface 326' of the substrate 302. The first portion of the second surface 326' is for example opposite to the first portion of the first surface 326 on which the first portion 175a of the first stack 300 is arranged. The first portion 175a of the first stack 300 in such cases is therefore opposite to the first portion of the second stack 300'. The first portion of the second stack 300' may therefore be overlapped by the first portion 175a of the first stack 300. In FIG. 10, the first portion of the second stack 300' includes the first portions of the second electrode layer 308a' and the electrolyte layer 306a' of the second stack 300'. The first portion of the second stack 300' also includes a first subportion 304aa' of the first portion 304a' of the first electrode layer 304' of the second stack 300. The first subportion 304aa' is for example a section of the first portion 304a' of the first electrode layer 304' to the left of the first axis 174a in FIG. 10.

In the example of FIG. 10, the folded intermediate structure 172 also includes a second portion of the first stack 300 on a second portion of the first surface 326 of the substrate 302. The second portion of the first stack 300 is overlapped by the first portion 175a of the first stack 300 and the first portion of the second stack 300'. In FIG. 10, the second portion of the first stack 300 may be considered to correspond to a portion of the fourth stack 300'''. The second portion of the first stack 300 may therefore be considered to include the first portions of the second electrode layer 308a''' and the electrolyte layer 306a''' of the fourth stack 300'''. The second portion of the first stack 300 may also be considered to include a first subportion 304aa''' of the first portion 304a''' of the first electrode layer 304''' of the fourth stack 300'''.

The folded intermediate structure 172 of FIG. 10 also includes a second portion of the second stack 300' on a second portion of the second surface 326' of the substrate 302. The second portion of the second stack 300' is overlapped by the first portion 175a of the first stack 300, the first portion of the second stack 300' and the second portion of the first stack 300 (which in FIG. 10 is a portion of the fourth stack 300'''). In FIG. 10, the second portion of the second stack 300' may therefore be considered to correspond to a portion of the sixth stack 300''''. The second portion of the second stack 300' may therefore be considered to include the first portions of the second electrode layer 308a'''' and the electrolyte layer 306a'''' of the sixth stack 300''''. The second portion of the second stack 300' may also be considered to include a first subportion 304aa'''' of the first portion 304a'''' of the first electrode layer 304'''' of the sixth stack 300''''.

The folded intermediate structure 172 may be cut along axes aligned with each of the grooves in the first stack 300. In FIG. 10, the folded intermediate structure 172 is cut along a second axis 174b aligned with the third groove 152b and along a third axis 174c aligned with the fifth groove 152c. In this way, the folded intermediate structure 172 is segmented into first, second, third and fourth precursors 176a-176d.

It is to be noted that, in the example of FIG. 10, the grooves are each filled with electrically insulating material 336 prior to segmenting the folded intermediate structure 172. Hence, the cuts are formed through the electrically insulating material 336 in each of the grooves. However, in other examples, the folded intermediate structure may be segmented prior to deposition of electrically insulating material in some or all of the grooves.

Figure 11:
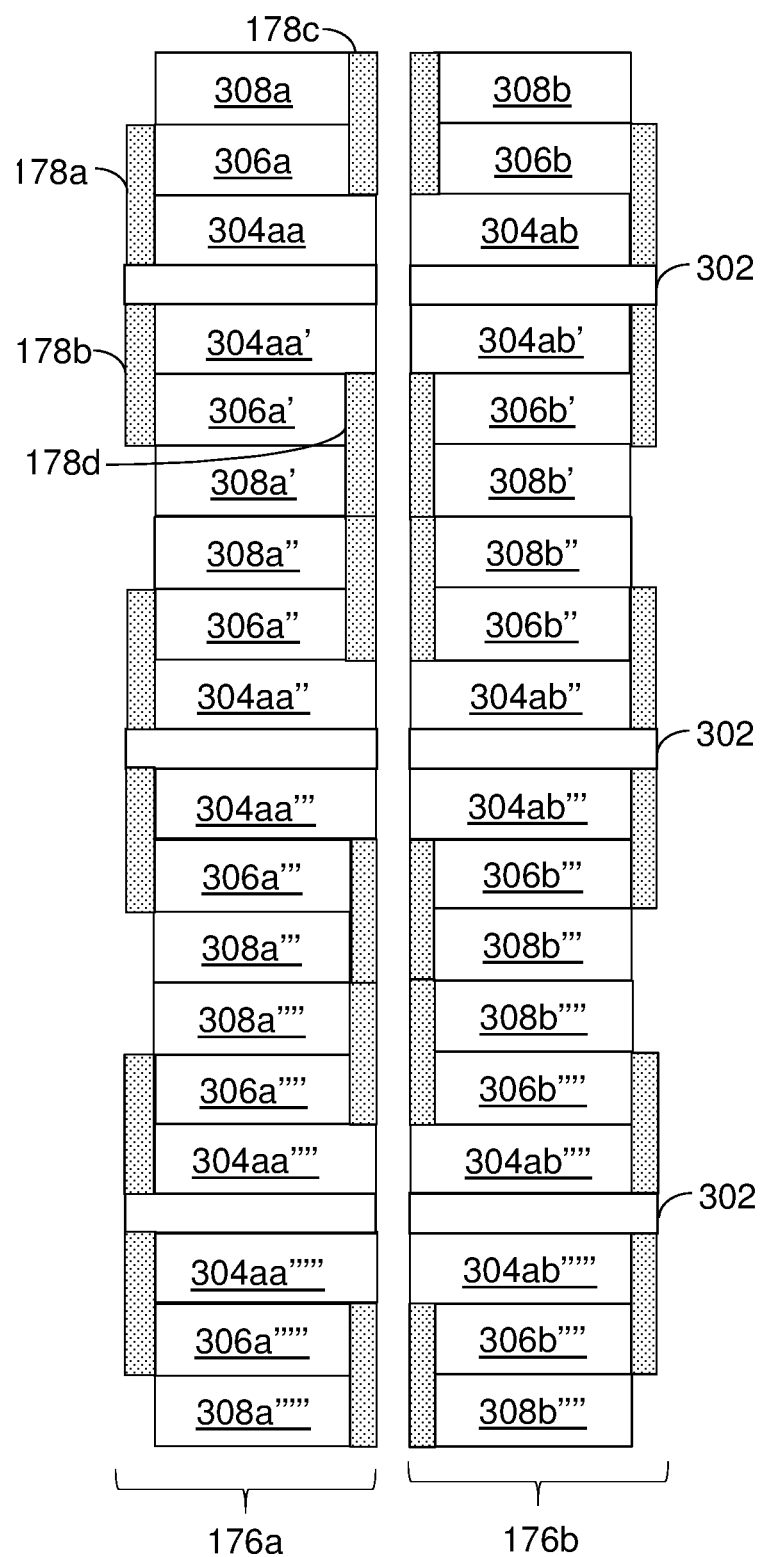
FIG. 11 is a schematic diagram illustrating a multi-stack structure formed by cutting the folded intermediate structure of FIG. 9, as shown in FIG. 10.

The first and second precursors 176a, 176b formed by the cutting of FIG. 10 are illustrated schematically in FIG. 11. Each precursor may be considered to correspond to a multi-stack structure for an energy storage device.

A multi-stack structure corresponding to the first precursor 176a in FIG. 11 includes a portion of the first stack 300 (which may itself be considered to correspond to a first stack). After segmentation, the first portion 308a of the second electrode layer 308 of the first stack 300 may be considered to correspond to a second electrode of the first stack. The first portion 306a of the electrolyte layer 306 of the first stack 300 may be considered to correspond to a first electrolyte of the first stack. Similarly, the first subportion 304aa of the first portion 304a of the first electrode layer 304 of the first stack 300 may be considered to correspond to a first electrode of the first stack. The first electrode is closer to the substrate 302 than the second electrode.

The first precursor 176a of FIG. 11 also includes a portion of the second stack 300' (which may itself be considered to correspond to a second stack). After segmentation, the first portion 308a' of the second electrode layer 308' may be considered to correspond to a fourth electrode of the second stack. The first portion 306a' of the electrolyte layer 306' may be considered to correspond to a second electrolyte of the second stack. Similarly, the first subportion 304aa' of the first portion 304a' of the first electrode layer 304' may be considered to correspond to a third electrode of the second stack. The third electrode is closer to the substrate 302 than the fourth electrode.

In FIG. 11, a first electrical insulator 178a is in contact with a first exposed surface of the first electrode and a first exposed surface of the first electrolyte without contacting at least a portion of a first exposed surface of the second electrode. Similarly, a second electrical insulator 178b is in contact with a first exposed surface of the third electrode and a first exposed surface of the second electrolyte without contacting at least a portion of a first exposed surface of the fourth electrode. A third electrical insulator 178c is in contact with a second exposed surface of the first electrode, a second exposed surface of the first electrolyte and a second exposed surface of the second electrode. A fourth electrical insulator 178d is in contact with a second exposed surface of the third electrode, a second exposed surface of the second electrolyte and a second exposed surface of the fourth electrode. The electrical insulators 178a-178d of FIG. 11 are similar to the electrical insulators 144a-144d and 146a-146c described with reference to FIG. 3e. Corresponding descriptions are to be taken to apply.

The electrical insulators 178a-178d of FIG. 11 are for example formed by cutting through the electrically insulating material 336 illustrated in FIG. 10, during segmentation of the folded intermediate structure 172. In the example of FIG. 11, the first electrical insulator 178a is in substantial alignment with the second electrical insulator 178b. The third electrical insulator 178c is in substantial alignment with the fourth electrical insulator 178d, although this need not be the case.

The first electrical insulator 178a of FIG. 11 is arranged at a first side of the first stack and the second electrical insulator 178b is arranged at a first side of the second stack. The third electrical insulator 178c is arranged at a second side of the first stack and the fourth electrical insulator 178d is arranged at a second side of the second stack. The first side of the first stack is opposite to the second side of the first stack, and the first side of the second stack is opposite to the second side of the second stack. In FIG. 11, the first sides of the first and second stacks are in alignment with each other, and the second sides of the first and second stacks are in alignment with each other, although this is merely an example.

In FIG. 11, the third electrical insulator 178c overlaps the second exposed surface of the first electrode, and a plane of the second exposed surface of the first electrode is substantially parallel to a plane of the first side of the substrate 302. The fourth electrical insulator 178d is overlapped by the second exposed surface of the third electrode, and a plane of the second exposed surface of the third electrode is substantially parallel to a plane of the second side of the substrate 302. In this way, the second exposed surface of the first electrode forms a shelf or ledge to support the third electrical insulator 178c.

In other embodiments, though, the first electrical insulator 178a (which insulates the first electrode and the first electrolyte of the first stack) may be in substantial alignment with the fourth electrical insulator 178d (which insulates the second electrolyte and the fourth electrode of the second stack), rather than the second electrical insulator 178b. In such cases, the second electrical insulator 178b (which insulates the third electrode and the second electrolyte of the second stack) may be in substantial alignment with the third electrical insulator 178c (which insulates the first electrolyte and the second electrode of the first stack).

In such cases, the first electrical insulator 178a may be arranged at a first side of the first stack, the fourth electrical insulator 178d may be arranged at a first side of the second stack, the third electrical insulator 178c may be arranged at a second side of the first stack and the second electrical insulator 178b may be arranged at a second side of the second stack. In this way, a position of the electrical insulators 178 relative to the first and second stacks 300, 300' may differ from that shown in FIG. 11, so as to expose different exposed surfaces of the first, second, third or fourth electrodes than those shown as exposed in FIG. 11.

Figure 12:
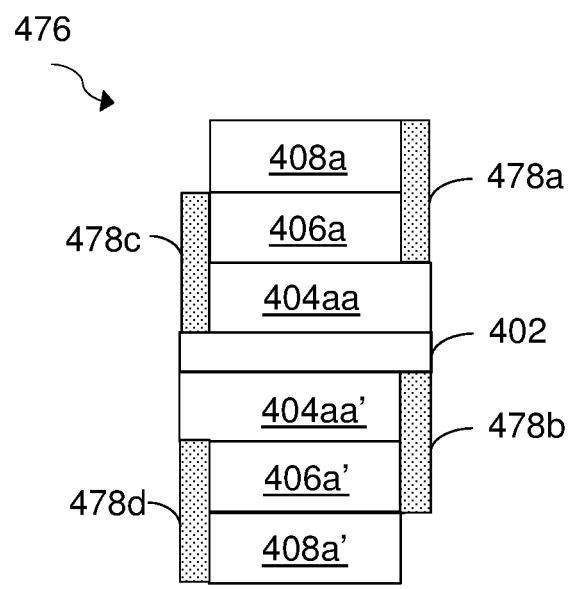
FIG. 12 is a schematic diagram illustrating an example of a portion of a precursor to an energy storage device.

FIG. 12 is a schematic diagram illustrating an example of a portion of a precursor 476 to an energy storage device which may be formed similarly to the precursors 176a, 176b of FIG. 11. However, whereas the precursors 176a, 176b of FIG. 11 are formed from a folded intermediate structure including the first and second stacks 300, 300' of FIG. 5, the precursor 476 of FIG. 12 is formed from a folded intermediate structure including the first and second stacks 400, 400' of FIG. 6. Features of FIG. 12 are labelled with the same reference numeral as corresponding features of FIG. 11, but prepended by a "4" rather than a "1" or a "3". Corresponding descriptions are to be taken to apply.

In FIG. 12, the first electrical insulator 478a is in contact with an exposed surface of the first electrode (which for example corresponds to an exposed surface of a first subportion 404aa of a first portion 404a of the first electrode layer 404 of the stack 400). The first electrical insulator 478a in this example overlaps the exposed surface of the first electrode, and a plane of the exposed surface of the first electrode is substantially parallel to a plane of the first side of the substrate 402. In such cases, the exposed surface of the first electrode may for example be an upper surface of the first electrode, which forms a ledge or shelf for supporting the electrically insulating material, which later forms the first electrical insulator. The first electrical insulator 478a also contacts an exposed surface of the first electrolyte (which for example corresponds to an exposed surface of a first portion 406a of the electrolyte layer 406 of the first stack 400), and an exposed surface of the second electrode (which for example corresponds to an exposed surface of a first portion 408a of the second electrode layer 408 of the first stack 400).

The second electrical insulator 478b is in alignment with the first electrical insulator 478a in FIG. 12 (although this need not be the case). However, the second electrical insulator 478b contacts an exposed surface of the third electrode (which for example corresponds to an exposed surface of a first subportion 404aa" of the first portion 404a' of the first electrode layer 404' of the second stack 400'). The second electrical insulator 478b also contacts an exposed portion of the second electrolyte (which for example corresponds to an exposed surface of a first portion 406a' of the electrolyte layer 406' of the second stack 400') but does not contact at least a portion (in this example, an entirety of) an exposed surface of the fourth electrode (which for example corresponds to an exposed surface of a first portion 408a' of the second electrode layer 408' of the second stack 400').

Similarly, the third electrical insulator 478c insulates the first electrolyte and the first electrode of the first stack, and the fourth electrical insulator 478d insulates the second electrolyte and the fourth electrode of the second stack in FIG. 12. The third and fourth electrical insulators 478c, 478d are in substantial alignment with each other in this example. Hence, in FIG. 12, the first and second electrical insulators are arranged on one side of the precursor 476, and the third and fourth electrical insulators are arranged on an opposite side of the precursor 476. However, the electrical insulators 476a-476d generally extend in a direction perpendicular to a plane of the substrate 402, so as to insulate a portion of respective sides of the precursor 476, while leaving certain surfaces exposed for subsequent connection to an external circuit, via electrically conductive material.

The precursors 176a, 176b, 478 of FIGS. 11 and 12 may each be considered to be multi-stack structures, and may each also be considered to correspond to cells of an energy storage device.

The above embodiments are to be understood as illustrative examples. Further examples are envisaged. For example, a cell similar to the cells 142 of FIG. 3e may be formed using a similar method to that of FIG. 4, in which precursor grooves are formed, at least partly filled with an electrically insulating material before subsequent selective ablation of the electrically insulating material.

FIGS. 3d and 4e illustrate cutting of intermediate structures without undergoing a z-folding process, for ease of illustration. However, it is to be appreciated that, in some cases, intermediate structures similar to those of FIGS. 3d and 4e may undergo a z-folding process to form a z-fold arrangement as described with reference to FIG. 2 before subsequently undergoing cutting to separate the intermediate structures into cells. In such cases, the electrically insulating material 136, 236 in the grooves 128, 228 may be aligned in the z-fold arrangement. The intermediate structure may then be cut along an axis aligned with the electrically insulating material 136, 236 (which for example corresponds with an axis 140, 240 aligned with the grooves 128, 228). This may further improve the efficiency of the method by reducing the number of cutting operations compared with examples without the formation of such a z-fold arrangement. For example, a process similar to those described with reference to FIGS. 7 to 10 may be used to fold and cut the intermediate structures shown in FIGS. 3d and 4e.

It is to be appreciated that, in the examples described with reference to FIGS. 7 to 12, a stack of a different structure may be used instead of any of the stacks 300-300''''.

Furthermore, the stack 200 of FIG. 4 may be manufactured using a double-sided processing technique such as that described with reference to any of FIGS. 5 to 10.

In embodiments described herein, a first stack on a first side of a substrate has the same layer order as a second stack on a second side of the substrate, opposite to the first side. For example, the first electrode layer of the first stack may be closer than the second electrode layer of the first stack to the first side of the substrate. Similarly, the first electrode layer of the second stack may be closer than the second electrode layer of the second stack to the second side of the substrate. However, in other examples, the first stack and the second stack may have a different layer order than each other. For example, an order of deposition of layers of the second stack may be opposite to that of the first stack. For example, whereas the first electrode layer (e.g. a cathode) of the first stack may be closer than the second electrode layer (e.g. an anode) of the first stack to the first side of the substrate, the second electrode layer (e.g. an anode) of the second stack may be closer than the first electrode layer (e.g. a cathode) of the second stack to the second side of the substrate in such examples. This may aid the management of coating stresses. Such embodiments may be manufactured as set out in the examples herein, but using a different layer order for the first stack than the second stack.

For example, a layer order of the second stack may be opposite to a layer order of the first stack in examples which are otherwise similar to FIG. 6. In such cases, a portion of a different instance of the same type of layer may be exposed at the same side of the energy storage device after subsequent processing. For example, a portion of the first electrode layer of each of the first and second stacks (or a portion of the second electrode layer of each of the first and second stacks) may be exposed at the same side of the energy storage device after cutting through the first and second stacks, e.g. as shown in FIG. 7, 8 or 10. This therefore allows corresponding electrode layers of the first and second stacks to be connected in parallel.

In the case of double-sided deposition by inkjet material deposition such as inkjet printing, it may be beneficial to maintain the top-down arrangement for the inkjet material deposition, for example as described with reference to FIG. 5, even in the case where anode, electrolyte, and cathode layers are also formed on the second side 302b of the substrate layer 302.

Figure 13:
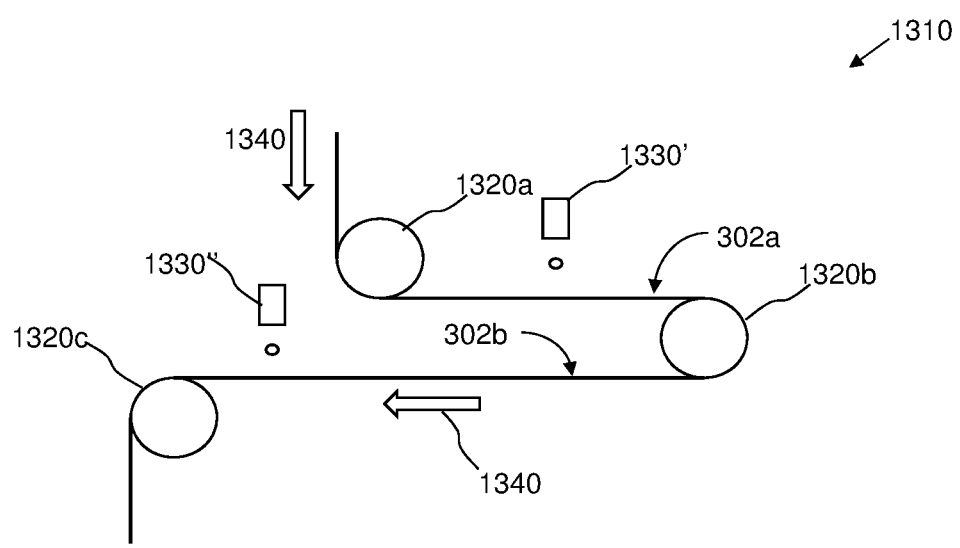
FIG. 13 illustrates schematically an example arrangement of the deposition apparatus according to some embodiments.

FIG. 13 illustrates schematically an example arrangement of the deposition apparatus 1310 that facilitates top-down inkjet material deposition, such as inkjet printing, of an ink material onto a stack that has layers formed on both sides 302a,302b of a substrate 302.

Referring to FIG. 13, the deposition apparatus 1310 comprises rollers 1320a, 1320b, 1320c arranged to guide movement of the stack such that a first side of the stack is presented for top-down inkjet material deposition, such as inkjet printing, of an ink material from a first inkjet material deposition component, e.g. inkjet printing nozzle 1330' and such that a second side of the stack is presented for top-down inkjet material deposition, e.g. inkjet printing, of the ink material from a second inkjet deposition component, e.g. inkjet printing nozzle 1330".

More specifically, as illustrated in FIG. 13, the stack travels over rollers 1320a, 1320b, 1320c in a first direction of travel 1340, for example as part of a reel-to-reel type process. The stack passing over and being tensioned between the first roller 1320a and the second roller 1320b causes the first side of the stack to face upwards towards the first nozzle 1330'. As the stack passes over the second roller 1320b, the stack is inverted. The stack passing over and being tensioned between the second roller 1320b and the third roller 1320c causes the second side of the stack to face upwards towards the second nozzle 1330". In this way, top-down printing of the ink material may be provided in a reel-to-reel type process, which may for example be substantially continuous. This may provide for efficient cell production. Performing the inkjet printing top-down may allow for accurate and efficient deposition of an ink material.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method for manufacturing an energy storage device, the method comprising:
providing a first stack on a first side of a substrate, the first stack comprising a first electrode layer, a second electrode layer, and a first electrolyte layer between the first electrode layer and the second electrode layer, the first electrode layer closer than the second electrode layer to the first side of the substrate;
providing a second stack on a second side of the substrate, opposite to the first side of the substrate, the second stack comprising a third electrode layer, a fourth electrode layer, and a second electrolyte layer between the third electrode layer and the fourth electrode layer, the third electrode layer closer than the fourth electrode layer to the second side of the substrate;
forming a first groove in a first side of the first stack, the first side of the first stack opposite to a second side of the first stack in contact with the first side of the substrate, the first groove having a first depth;
forming a second groove in a first side of the second stack, the first side of the second stack opposite to a second side of the second stack in contact with the second side of the substrate, the second groove having a second depth;
forming a third groove in the first side of the first stack, the third groove having a third depth different from the first depth; and
forming a fourth groove in the first side of the second stack, the fourth groove having a fourth depth different from the second depth.

2. The method of claim 1, wherein the first groove is in substantial alignment with the second groove, and the third groove is in substantial alignment with the fourth groove.

3. The method of claim 1, wherein the first groove and the second groove are formed without cutting the substrate, the third groove is formed without cutting the first electrode layer, and the fourth groove is formed without cutting the third electrode layer.

4. The method of claim 1, wherein the first depth is the same as the second depth and the third depth is the same as the fourth depth.

5. The method of claim 1, wherein the first groove is formed without cutting the first electrode layer, the second groove is formed without cutting the substrate, the third groove is formed without cutting the substrate, and the fourth groove is formed without cutting the third electrode layer.

6. The method of claim 1, wherein the first depth is the same as the fourth depth and the third depth is the same as the second depth.

7. The method of claim 1, wherein at least one of: the first depth of the first groove, the second depth of the second groove, the third depth of the third groove, or the fourth depth of the fourth groove is perpendicular to a plane of the first side of the substrate.

8. The method of claim 1, wherein:
forming the first groove and forming the third groove uses a first at least one laser beam directed towards the first side of the substrate; and
forming the second groove and forming the fourth groove uses a second at least one laser beam directed towards the second side of the substrate.

9. The method of claim 1, comprising folding the substrate to provide a multi-stack arrangement comprising:
a first portion of the first stack on a first portion of the first side of the substrate;
a first portion of the second stack on a first portion of the second side of the substrate, opposite to the first portion of the first side of the substrate, the first portion of the second stack overlapped by the first portion of the first stack;
a second portion of the first stack on a second portion of the first side of the substrate, the second portion of the first stack overlapped by the first portion of the first stack and the first portion of the second stack; and
a second portion of the second stack on a second portion of the second side of the substrate, opposite to the second portion of the first side of the substrate, the second portion of the second stack overlapped by the first portion of the first stack, the first portion of the second stack and the second portion of the first stack.

10. The method of claim 9, wherein, after folding the substrate:
the first groove is between the first portion of the first stack and a third portion of the first stack on a third portion of the first side of the substrate in the same plane as the first portion of the first stack; and
the method comprises cutting the multi-stack arrangement along a longitudinal axis in substantial alignment with the first groove.

11. The method of claim 10, wherein the energy storage device is a first energy storage device, and cutting the multi-stack arrangement separates:
a first precursor to the first energy storage device from a second precursor to a second energy storage device, the first precursor comprising the first portion of the first stack, the first portion of the second stack, the second portion of the first stack and the second portion of the second stack.

12. An energy storage device formed according to the method of claim 1.

* * * * *